(12) United States Patent
Sun et al.

(10) Patent No.: US 8,906,995 B2
(45) Date of Patent: Dec. 9, 2014

(54) POLYMER COMPOSITIONS, METHOD OF MANUFACTURE, AND ARTICLES FORMED THEREFROM

(71) Applicant: SABIC Innovative Plastics IP B.V., Bergen op Zoom (NL)

(72) Inventors: Bin Sun, Newburgh, IN (US); Amit Kulkarni, Evansville, IN (US); James Louis DeRudder, Mt. Vernon, IN (US)

(73) Assignee: SABIC Global Technologies B.V. (NL)

( * ) Notice: Subject to any disclaimer, the term of this patent is extended or adjusted under 35 U.S.C. 154(b) by 0 days.

(21) Appl. No.: 13/833,629

(22) Filed: Mar. 15, 2013

(65) Prior Publication Data

US 2014/0275375 A1    Sep. 18, 2014

(51) Int. Cl.
| | |
|---|---|
| *C08K 3/32* | (2006.01) |
| *C08K 5/098* | (2006.01) |
| *C08K 5/04* | (2006.01) |
| *C08L 69/00* | (2006.01) |

(52) U.S. Cl.
CPC ............. *C08L 69/00* (2013.01); *C08K 5/098* (2013.01); *C08K 5/04* (2013.01); *C08K 3/32* (2013.01)
USPC ........................................................ 524/417

(58) Field of Classification Search
CPC .... C08K 2003/423; C08L 69/00; C08L 55/02
USPC ........................................................ 524/417
See application file for complete search history.

(56) References Cited

U.S. PATENT DOCUMENTS

| | | | |
|---|---|---|---|
| 7,393,896 B2 | 7/2008 | DeRudder et al. | |
| 2010/0130643 A1 | 5/2010 | Rohrbach | |
| 2010/0190913 A1 | 7/2010 | Seidel | |
| 2012/0157628 A1 * | 6/2012 | Navarro et al. | 525/66 |
| 2012/0157630 A1 | 6/2012 | Navarro et al. | |
| 2013/0203911 A1 * | 8/2013 | Kulkarni et al. | 524/153 |

FOREIGN PATENT DOCUMENTS

| | | | |
|---|---|---|---|
| EP | 0900827 A2 | | 9/1998 |
| JP | 2010150301 | * | 7/2010 |

OTHER PUBLICATIONS

PCT, International Searching Authority, Search Report, PCT/US2014/027106, Date of mailing: Jun. 23, 2014, 4 pages.
PCT, International Searching Authority, Written Opinion, PCT/US2014/027106, Date of mailing: Jun. 23, 2014, 4 pages.

* cited by examiner

*Primary Examiner* — Peter Szekely
(74) *Attorney, Agent, or Firm* — Cantor Colburn LLP

(57) ABSTRACT

An impact resistant polycarbonate composition having improved resistance to polymer degradation comprises an aromatic polycarbonate in admixture with an elastomer-modified graft copolymer that is the product of an emulsion polymerization process, wherein composition is a product of compounding the aromatic polycarbonate and the elastomer-modified graft copolymer in the presence of a buffer comprising a potassium salt of phosphoric acid.

30 Claims, 4 Drawing Sheets

POLYMER COMPOSITIONS, METHOD OF MANUFACTURE, AND ARTICLES FORMED THEREFROM

FIELD OF THE INVENTION

The present invention is directed to a polycarbonate thermoplastic composition. More specifically, the composition comprises a combination of an aromatic polycarbonate resin and an elastomer-modified graft copolymer that has improved resistance to polymer degradation.

BACKGROUND OF THE INVENTION

Polycarbonate/acrylonitrile-butadiene-styrene (polycarbonate/ABS) blends, products commercially available from SABIC Innovative Plastics, are an important class of polymeric materials for reasons of their excellent balance of properties such as low-temperature ductility, heat resistance, and outstanding aesthetics combined with ease of processing.

The polycarbonate portion of such a blend, however, is susceptible to degradation by acids and bases, especially under conditions of high heat and humidity. Degradation can cause undesirable color formation, loss of molecular weight, reduced chemical resistance or inferior mechanical properties. Furthermore, polycarbonate degradation can generate volatiles that can cause defects in surface appearance, for example, splay in molded parts.

These problems can be exacerbated by the addition of elastomeric impact modifiers that are commonly used to improve the toughness of polycarbonate compositions. In particular, an elastomer-containing impact modifier prepared by emulsion polymerization can decrease the stability of a polycarbonate. Specifically, transesterification or degradation of a polycarbonate can be promoted by compounds employed as aids in the emulsion polymerization of the impact modifier, during its preparation, which compounds can remain as residues within the impact modifier. For example, U.S. Pat. No. 7,393,896 discloses that alkali metal salts of fatty acid emulsifiers, used during emulsion polymerization of an impact modifier to stabilize the emulsion, can later catalyze transesterification or degradation of a polycarbonate composition containing that impact modifier. In turn, such polycarbonate degradation, due to residual amounts of such emulsifiers remaining in the impact modifier, can result in inconsistent thermal stability of the polycarbonate composition. Furthermore, problems can occur during the molding of the polycarbonate composition, due to the variability in viscosity resulting from the degradation or transesterification of the polycarbonate component of the composition.

In view of the above, the use of emulsion-prepared elastomer-modified graft copolymers in polycarbonate compositions has been avoided, in some cases, in favor of bulk polymerized elastomer-modified graft copolymers, particularly when a stringent requirement for hydrostability exists. Such hydrostability requirement can exist with respect to molded parts used in the automotive industry. A bulk polymerized elastomer-modified graft copolymer such as acrylonitrile-butadiene-styrene ("bulk ABS") is essentially free of any surfactant, unlike emulsion polymerized ABS. When higher hydrostability is desired, bulk ABS can be used in admixture with a small amount of sulfonate-based MBS to improve the impact resistance of a polycarbonate composition, as disclosed in EP 0900827 and U.S. Pat. No. 7,393,896 assigned to Sabic Innovative Plastics.

Because of the relatively lower elastomer content in bulk ABS, however, it usually cannot be used (or used alone) when higher impact resistance is desired, such as could otherwise be obtained by an emulsion-prepared ABS. An emulsion-prepared ABS can have elastomer levels as high as 60 wt. % or more.

As indicated above, replacing alkali metal carboxylate based surfactants, previously used in preparing elastomer-modified graft copolymers, with a sulfonate surfactant can improve the stability of a polycarbonate/ABS blend, as disclosed by U.S. Pat. No. 7,393,896. Specifically, hydrostability improvement has previously been demonstrated by the use of weaker acid based surfactants (e.g., sulfates, sulphonates, or the like) and/or the use of coagulants such as calcium chloride during the manufacturing processes.

However, further improvement is still desired to meet stringent demands for stability required for certain molded parts. Moreover, it would be desirable to improve the hydrostability of impact modified polycarbonate compositions without requiring extensive changes to conventional methods of manufacturing the impact modifiers. Significant investment in the resin plants for manufacturing the impact modifiers represents a challenge to the implementation of significant process modifications.

In view of the above, an object of the present invention is to provide an impact-modified polycarbonate composition having improved resistance to polymer degradation, even under strenuous conditions. In particular, an improved balance of high impact resistance and excellent hydrostability and thermal stability is desired. Furthermore, it would be desirable to improve hydrostability of impact modified polycarbonate compositions without changing the manufacturing process used to make the impact modifier.

SUMMARY OF THE INVENTION

After exploring different process and material variables, Applicants surprisingly discovered that compounding a composition comprising an aromatic polycarbonate and an elastomer-modified graft copolymer in the presence of a buffer comprising metallic salts of phosphoric acid, at least one of which comprises potassium cations, can significantly improve the hydrostability of the composition.

In particular, the invention is directed to an impact resistant polycarbonate composition having improved resistance to polymer degradation comprising an aromatic polycarbonate in admixture with an elastomer-modified graft copolymer that is the product of an emulsion polymerization process, wherein the composition is a product of compounding the aromatic polycarbonate and the elastomer-modified graft copolymer in the presence of a buffer comprising metallic salts of phosphoric acid, wherein the buffer comprises a weak acid form and a conjugate base form that is capable of providing a pH of 6.3 to 7.0, specifically 6.4 to 6.9, in distilled water, wherein at least one of the weak acid form and conjugate base form comprises a potassium salt of phosphorous acid. Advantageously, the resulting polycarbonate composition can have a melt flow rate (MFR) that, after aging in an oven for 1000 hours at 90±2° C. and 95±3% RH (relative humidity), does not change by more than 5.0 g/10 minutes units.

Another aspect of the invention is directed to an impact resistant polycarbonate composition having improved resistance to polymer degradation comprising an aromatic polycarbonate in admixture with an elastomer-modified graft copolymer that is the product of an emulsion polymerization process, the composition further comprising metallic salts of phosphoric acid, at least one of which is a potassium salt if phosphoric acid, wherein the metallic salts of phosphoric acid are present in the composition in an amount that provides a phosphorus content of 0.01 to 0.16 mol/10 lbs (0.0022 to 0.035 mol/kg), based on weight of the composition. The metallic salts of phosphoric acid have a weak acid form and a conjugate base form capable of forming a buffer in distilled water having a pH of 6.3 to 7.0, specifically 6.4 to 6.9.

Still another aspect of the invention is directed to a method of preparing a polymer composition having improved resistance to polymer degradation comprising carrying out emulsion polymerization of a monomer mixture comprising a diene monomer, thereby forming an elastomer polymer; grafting monomers onto the elastomer polymer to obtain an elastomer-modified graft copolymer; and compounding the aromatic polycarbonate and the elastomer-modified graft copolymer, optionally with a polymer flow promoter, in the presence of a buffer comprising metallic salts of phosphoric acid at least one of which is a potassium salt of phosphoric acid. The metallic salts comprise a weak acid form and a conjugate base form. The metallic salts of phosphoric acid comprise phosphorus in an amount of 0.01 to 0.16 mol/10 lbs (0.0022 to 0.035 mol/kg) of the composition obtained by the method and the ratio of the weak acid form to the conjugate base form is capable of providing a pH of 6.3 to 7.0, specifically 6.4 to 6.9 in water.

DETAILED DESCRIPTION OF THE INVENTION

Figure 1:
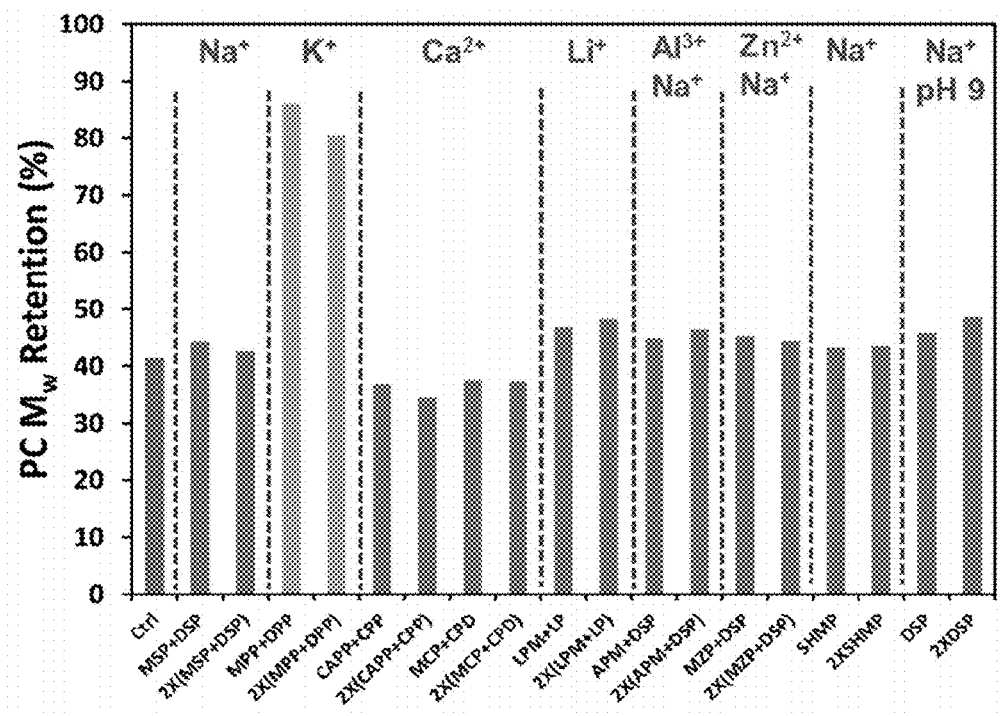
FIG. 1 show a plot of percent polycarbonate molecular weight retention of extruded pellets after hydro-aging for 11 days as a function of buffer cation forms, and strengths thereof, added during compounding.

Surprisingly, it has now been discovered that degradation of an impact resistant polycarbonate composition can be reduced or eliminated by means of compounding an aromatic polycarbonate and an elastomer-modified graft copolymer in the presence of a buffer comprising a metallic salts of phosphoric acid comprising potassium cations, the buffer comprising a weak acid and a conjugate base (in equilibrium) capable of providing a pH of 6.3 to 7.0, specifically 6.4 to 6.9 in distilled water. This allows preparation of an impact resistant polycarbonate composition that, even though containing residual amounts of acidic compounds from the preparation of the elastomer-modified graft copolymer, does not result in significant degradation of the polycarbonate component of the composition.

Compromised hydrostability performance has been observed in prior art polycarbonate blends with high rubber graft (HRG) impact modifiers due to the presence of various residues such as surfactants (e.g., tallow fatty acid, dimer acid, or the like) and coagulants (e.g., sulfuric acid or the like) in HRG impact modifiers, for example emulsion-prepared acrylonitrile-butadiene-styrene graft copolymers (ABS). Without wishing to be bound by theory, it is believed that the addition of a buffer, according to the present invention, during compounding of polycarbonate and emulsion-prepared ABS enables enhanced hydrostability performance by neutralizing residual additives used in preparing the components of the composition.

Furthermore, since the present composition is not prone to degrading polycarbonate, acidic coagulants or the like can be left in the elastomeric impact modifier when blended with polycarbonate. Treatment of the elastomer-modified graft copolymer (which can potentially cause other problems) is not required, nor is extensive washing or other purification steps, to reduce residual additives in the elastomer-modified graft copolymer before use as an impact modifier in a polycarbonate composition.

Thus, one aspect of this invention relates to an impact modified polycarbonate composition having improved stabilization against degradation or transesterification, resulting in improved thermal stability during processing and improved hydrostability of the articles made from the composition, after molding, during use of the articles. In other words, the present invention is directed to improving the stability of an impact modified polycarbonate composition without going backward to the process of making the impact modifier utilized in the polycarbonate composition.

As used herein the singular forms "a," "an," and "the" include plural referents. The term "combination" is inclusive of blends, mixtures, alloys, reaction products, and the like. Unless defined otherwise, technical and scientific terms used herein have the same meaning as is commonly understood by one of skill. Compounds are described using standard nomenclature. The term "and a combination thereof" is inclusive of the named component and/or other components not specifically named that have essentially the same function. "Or" means "and/or." Other than in the operating examples or where otherwise indicated, all numbers or expressions referring to quantities of ingredients, reaction conditions, and the like, used in the specification and claims are to be understood as modified in all instances by the term "about." Various numerical ranges are disclosed in this patent application. Because these ranges are continuous, they include every value between the minimum and maximum values. The endpoints of all ranges reciting the same characteristic or component are independently combinable and inclusive of the recited endpoint. Unless expressly indicated otherwise, the various numerical ranges specified in this application are approximations. The term "from more than 0 to" an amount means that the named component is present in some amount more than 0, and up to and including the higher named amount.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

As used herein, the term "hydrocarbyl" or "hydrocarbon" refers broadly to a substituent comprising carbon and hydrogen, optionally with 1 to 3 heteroatoms, for example, oxygen, nitrogen, halogen, silicon, sulfur, or a combination thereof; "alkyl" refers to a straight or branched chain, saturated monovalent hydrocarbon group; "alkylene" refers to a straight or branched chain, saturated, divalent hydrocarbon group; "alkylidene" refers to a straight or branched chain, saturated divalent hydrocarbon group, with both valences on a single common carbon atom; "alkenyl" refers to a straight or branched chain monovalent hydrocarbon group having at least two carbons joined by a carbon-carbon double bond; "cycloalkyl" refers to a non-aromatic monovalent monocyclic or multicyclic hydrocarbon group having at least three carbon atoms, "cycloalkenyl" refers to a non-aromatic cyclic divalent hydrocarbon group having at least three carbon atoms, with at least one degree of unsaturation; "aryl" refers to an aromatic monovalent group containing only carbon in the aromatic ring or rings; "arylene" refers to an aromatic divalent group containing only carbon in the aromatic ring or rings; "alkylaryl" refers to an aryl group that has been substituted with an alkyl group as defined above, with 4-methylphenyl being an exemplary alkylaryl group; "arylalkyl" refers to an alkyl group that has been substituted with an aryl group as defined above, with benzyl being an exemplary arylalkyl group; "acyl" refers to an alkyl group as defined above with the indicated number of carbon atoms attached through a carbonyl carbon bridge (—C(=O)—); "alkoxy" refers to an alkyl group as defined above with the indicated number of carbon atoms attached through an oxygen bridge (—O—); and "aryloxy" refers to an aryl group as defined above with the indicated number of carbon atoms attached through an oxygen bridge (—O—).

Unless otherwise indicated, each of the foregoing groups can be unsubstituted or substituted, provided that the substitution does not significantly adversely affect synthesis, stability, or use of the compound. The term "substituted" as used herein means that at least one hydrogen on the designated atom or group is replaced with another group, provided that the designated atom's normal valence is not exceeded. When the substituent is oxo (i.e., =O), then two hydrogens on the atom are replaced. Combinations of substituents and/or variables are permissible provided that the substitutions do not significantly adversely affect synthesis or use of the compound. Exemplary groups that can be present on a "substituted" position include, but are not limited to, cyano; hydroxyl; nitro; azido; alkanoyl (such as a $C_{2-6}$ alkanoyl group such as acyl); carboxamido; $C_{1-6}$ or $C_{1-3}$ alkyl, cycloalkyl, alkenyl, and alkynyl (including groups having at least one unsaturated linkages and from 2 to 8, or 2 to 6 carbon atoms); $C_{1-6}$ or $C_{1-3}$ alkoxy groups; $C_{6-10}$ aryloxy such as phenoxy; $C_{1-6}$ alkylthio; $C_{1-6}$ or $C_{1-3}$ alkylsulfinyl; $C_{1-6}$ or $C_{1-3}$ alkylsulfonyl; aminodi($C_{1-6}$ or $C_{1-3}$)alkyl; $C_{6-12}$ aryl having at least one aromatic rings (e.g., phenyl, biphenyl, naphthyl, or the like, each ring either substituted or unsubstituted aromatic); $C_{7-19}$ alkylenearyl having 1 to 3 separate or fused rings and from 6 to 18 ring carbon atoms, with benzyl being an exemplary arylalkyl group; or arylalkoxy having 1 to 3 separate or fused rings and from 6 to 18 ring carbon atoms, with benzyloxy being an exemplary arylalkoxy group.

As used herein, the term "oxoacid" is defined to be an acid containing oxygen and at least one hydrogen atom bonded to oxygen and forming an ion by loss of one or more protons and having at least one other (central) element (specifically a phosphorus, nitrogen, sulfur or carbon atom) to which oxygen is bonded.

As used herein, pH is the decimal logarithm of the reciprocal of the hydrogen ion activity, as commonly defined and measured in the art.

As used herein, a buffer is fluid (comprising at least some water) and comprises a mixture of a weak acid and its conjugate base, or a weak based and its conjugate acid. Its pH changes very little when a small amount of strong acid or base is added to it and, thus, it is used to effectively prevent changes is the pH of a solution. In other words, buffer solutions are used as a means of keeping pH at a nearly constant value. Buffer solutions achieve their resistance of pH change because of the presence of an equilibrium between the acid HA and its conjugate base $A^-$ as represented by the equation: $HA^- \leftrightarrow H^+ + A^-$.

The term "buffer" or "buffering agent" will refer to the compounds capable of forming a buffer in an aqueous solution, and the pH of the buffer will refer to the pH obtainable by using the buffering agents in distilled water. Thus, the term buffer and buffering agents can refer to a combination of phosphate salts present in a solid composition that is in residual form but which phosphate salts are compounds that are capable of forming a buffer in an aqueous solution.

As indicated above, the invention is directed to a polycarbonate composition, comprising an impact modifier made by emulsion polymerization that exhibits improved thermal stability and hydrostability resulting from improved resistance to degradation of the polycarbonate component of the composition. Such degradation can significantly reduce the molecular weight of the polycarbonate, thereby adversely affecting physical, chemical, and mechanical properties, including melt viscosity and processing performance of the polycarbonate composition.

Specifically, the polycarbonate composition comprises an aromatic polycarbonate, an elastomer-modified graft copolymer that is the product of an emulsion polymerization process, and a combination of metallic salts of phosphoric acid wherein the amount of phosphorus atoms from the metallic salts of phosphoric acid is between 0.02 and 0.16 mol/10 lbs (0.0044 to 0.035 mol/kg), specifically 0.022 to 0.12 mol/10 lbs (0.0048 to 0.026 mol/kg), most specifically 0.025 to 0.08 mol/10 lbs (0.0055 to 0.018 mol/kg), based on the weight of the polycarbonate composition. In one embodiment, the buffering agents are present in the composition such that the amount of phosphorus in the composition is about 0.04 mol/10 lbs (0.0088 mol/kg), based on the weight of the composition. In one embodiment, the potassium cations represents of at least 50 mole percent, specifically at least 75 mole percent, of the cations in the metallic phosphate salts in the composition. The metallic salts of phosphoric acid have a weak acid form and a conjugate base form in a ratio that is capable of forming a buffer in distilled water having a pH of 6.3 to 7.0, specifically 6.4 to 6.9, more specifically 6.5 to 6.8.

The relative ratio of respective acid and base forms that comprise the buffer can be determined using the following Henderson-Hasselbalch equation:

$$pH = pKa + \log [\text{Base Form}(A-)]/[\text{Acid Form}(HA)].$$

In the present case, the $pKa_2 = 6.865$ for phosphoric acid and a pH of 6.8 is considered optimal.

In another aspect of the invention, an impact resistant polycarbonate composition having improved resistance to polymer degradation comprises an aromatic polycarbonate in admixture with an elastomer-modified graft copolymer that is the product of an emulsion polymerization process, wherein the composition is a product of compounding the aromatic polycarbonate and the elastomer-modified graft copolymer in the presence of a buffer comprising metallic salts of phosphoric acid, at least one of which comprises potassium cations, wherein the buffer comprises a weak acid form and a conjugate base form in a relative amount that is capable of providing a pH of 6.3 to 7.0, specifically 6.4 to 6.9 in water, wherein the phosphorus from the metallic salts of phosphoric acid is present in an amount of 0.01 to 0.16 mol/10 lbs (0.0022 to 0.035 mol/kg), based on the weight of the composition.

The metallic salts of phosphoric acid used as a buffer can further comprise a cation other than potassium selected from the group consisting of post-transition metals such as aluminum, alkali metals and alkaline earth metals such as sodium, lithium and calcium, and transition metals such as zinc, and combinations thereof (specifically selected from the group consisting of Al, Zn, Na, Li, Ca, and combinations thereof). The buffer can comprise a conjugate base form comprising potassium cation and a weak acid form comprising a different metallic cation. Alternatively, the buffer can comprise potassium cations in both the weak acid form and conjugate base form. Specifically, buffers can consist of weak acid and conjugate base pairs such as monopotassium phosphate/dipotassium phosphate, lithium phosphate monobasic/dipotassium phosphate, aluminum phosphate monobasic/dipotassium phosphate, monozinc phosphate/dipotassium phosphate, and combinations thereof.

The present composition is especially advantageous when the impact modifier is made by an emulsion process utilizing acidic coagulants. Prior art emulsion polymerization processes for preparing an elastomer-modified graft copolymer have commonly employed acidic coagulants. In preparing impact modifiers using such coagulants, however, it was found that residual amounts of the coagulant can remain in the impact modifier. The amount of residual acids can depend to some extent on the method of recovering the impact modifier. For example, spray drying of the impact modifier can affect the amount of residual additives remaining in the final product. In any case, however, the presence of residual additives from emulsion polymerization can potentially have an adverse effect on the stability of a composition based on polycarbonate when modified with the impact modifier in which such residual compounds are associated. The present invention can overcome such adverse affects.

Furthermore, a latex of the elastomer-modified graft copolymer, during its manufacture, can be treated with an acid to adjust the pH of the latex. Specifically, following grafting of the superstrate onto the emulsion polymerized elastomer phase to obtain a latex of the elastomer-modified graft copolymer product, but before coagulation of the grafted product to obtain a coagulated elastomer-modified graft copolymer and subsequent admixture of the coagulated elastomer-modified graft copolymer with the aromatic polycarbonate, the composition comprising the elastomer-modified graft copolymer product can be subjected to treatment with an acid to adjust its pH.

Polycarbonates useful in preparing polycarbonate compositions are generally aromatic polycarbonates. A "polycarbonate" means compositions having repeating structural carbonate units of formula (1)

(1)

in which at least 60 percent of the total number of $R^1$ groups contain aromatic moieties and the balance thereof are aliphatic, alicyclic, or aromatic. In an embodiment, each $R^1$ is a $C_{6-30}$ aromatic group, that is, contains at least one aromatic moiety. $R^1$ can be derived from a dihydroxy compound of the formula HO—$R^1$—OH, in particular of formula (2)

HO-$A^1$-$Y^1$-$A^2$-OH   (2)

wherein each of $A^1$ and $A^2$ is a monocyclic divalent aromatic group and $Y^1$ is a single bond or a bridging group having one or more atoms that separate $A^1$ from $A^2$. In one embodiment, one atom separates $A^1$ from $A^2$. Specifically, each $R^1$ can be derived from a dihydroxy aromatic compound of formula (3)

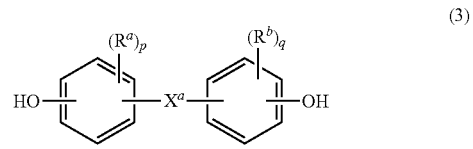

wherein $R^a$ and $R^b$ are each independently a halogen, $C_{1-12}$ alkoxy, or $C_{1-12}$ alkyl; and p and q are each independently integers of 0 to 4. It will be understood that $R^a$ is hydrogen when p is 0, and likewise $R^b$ is hydrogen when q is 0. Also in formula (3), $X^a$ is a bridging group connecting the two hydroxy-substituted aromatic groups, where the bridging group and the hydroxy substituent of each $C_6$ arylene group are disposed ortho, meta, or para (specifically para) to each other on the $C_6$ arylene group. In an embodiment, the bridging group $X^a$ is single bond, —O—, —S—, —S(O)—, —S(O)$_2$—, —C(O)—, or a $C_{1-18}$ organic group. The $C_{1-18}$ organic bridging group can be cyclic or acyclic, aromatic or non-aromatic, and can further comprise heteroatoms such as halogens, oxygen, nitrogen, sulfur, silicon, or phosphorous. The $C_{1-18}$ organic group can be disposed such that the $C_6$ arylene groups connected thereto are each connected to a common alkylidene carbon or to different carbons of the $C_{1-18}$ organic bridging group. In an embodiment, p and q is each 1, and $R^a$ and $R^b$ are each a $C_{1-3}$ alkyl group, specifically methyl, disposed meta to the hydroxy group on each arylene group.

In one embodiment, $X^a$ is a substituted or unsubstituted $C_{3-18}$ cycloalkylidene, a $C_{1-25}$ alkylidene of formula —C($R^c$)($R^d$)— wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl, or a group of the formula —C(=$R^e$)— wherein $R^e$ is a divalent $C_{1-12}$ hydrocarbon group. Groups of this type include methylene, cyclohexylmethylene, ethylidene, neopentylidene, and isopropylidene, as well as 2-[2.2.1]-bicycloheptylidene, cyclohexylidene, cyclopentylidene, cyclododecylidene, and adamantylidene.

In another embodiment, $X^a$ is a $C_{1-18}$ alkylene group, a $C_{3-18}$ cycloalkylene group, a fused $C_{6-18}$ cycloalkylene group, or a group of the formula —$B^1$-G-$B^2$— wherein $B^1$ and $B^2$ are the same or different $C_{1-6}$ alkylene group and G is a $C_{3-12}$ cycloalkylidene group or a $C_{6-16}$ arylene group. For example, $X^a$ can be a substituted $C_{3-18}$ cycloalkylidene of formula (4)

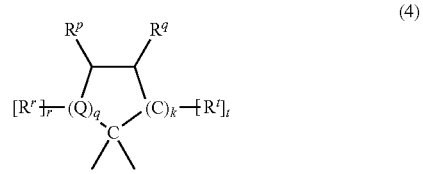

(4)

wherein $R^r$, $R^p$, $R^q$, and $R^t$ are each independently hydrogen, halogen, oxygen, or $C_{1-12}$ hydrocarbon groups; Q is a direct bond, a carbon, or a divalent oxygen, sulfur, or —N(Z)— where Z is hydrogen, halogen, hydroxy, $C_{1-12}$ alkyl, $C_{1-12}$ alkoxy, or $C_{1-12}$ acyl; r is 0 to 2, t is 1 or 2, q is 0 or 1, and k is 0 to 3, with the proviso that at least two of $R^r$, $R^p$, $R^q$, and $R^t$ taken together are a fused cycloaliphatic, aromatic, or heteroaromatic ring. It will be understood that where the fused ring is aromatic, the ring as shown in formula (4) will have an unsaturated carbon-carbon linkage where the ring is fused. When k is one and i is 0, the ring as shown in formula (4)

contains 4 carbon atoms, when k is 2, the ring as shown in formula (4) contains 5 carbon atoms, and when k is 3, the ring contains 6 carbon atoms. In an embodiment, two adjacent groups (e.g., $R^q$ and $R^t$ taken together) form an aromatic group, and in another embodiment, $R^q$ and $R^t$ taken together form one aromatic group and $R^r$ and $R^p$ taken together form a second aromatic group. When $R^q$ and $R^t$ taken together form an aromatic group, $R^p$ can be a double-bonded oxygen atom, i.e., a ketone.

Bisphenols (3) can be used in the manufacture of polycarbonates containing phthalimidine carbonate units of formula (4a)

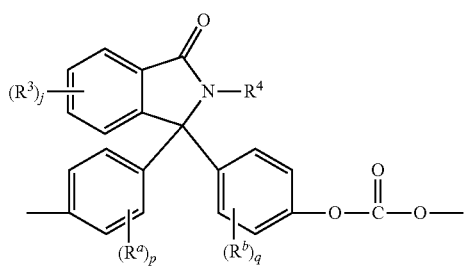

(4a)

wherein $R^a$, $R^b$, p, and q are as in formula (3), $R^3$ is each independently a $C_{1-6}$ alkyl group, j is 0 to 4, and $R_4$ is a $C_{1-6}$ alkyl, phenyl, or phenyl substituted with up to five $C_{1-6}$ alkyl groups. In particular, the phthalimidine carbonate units are of formula (4b)

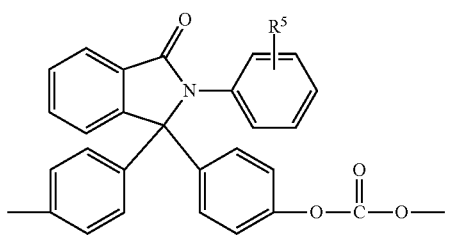

(4b)

wherein $R^5$ is hydrogen or a $C_{1-6}$ alkyl. In an embodiment, $R^5$ is hydrogen. Carbonate units (4a) wherein $R^5$ is hydrogen can be derived from 2-phenyl-3,3'-bis(4-hydroxy phenyl)phthalimidine (also known as N-phenyl phenolphthalein bisphenol, or "PPPBP") (also known as 3,3-bis(4-hydroxyphenyl)-2-phenylisoindolin-1-one).

Other bisphenol carbonate repeating units of this type are the isatin carbonate units of formula (4c) and (4d)

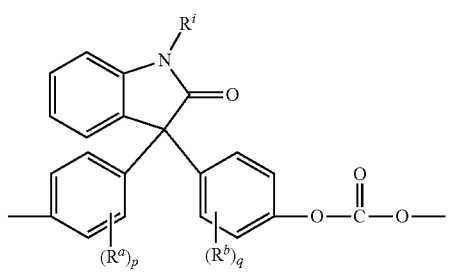

(4c)

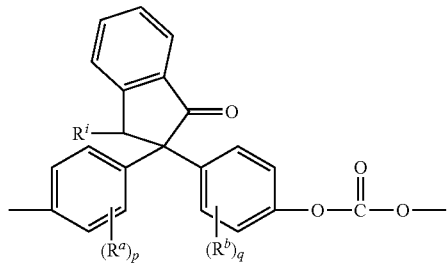

(4d)

wherein $R^a$ and $R^b$ are each independently $C_{1-12}$ alkyl, p and q are each independently 0 to 4, and $R^i$ is $C_{1-12}$ alkyl, phenyl, optionally substituted with 1 5 to $C_{1-10}$ alkyl, or benzyl optionally substituted with 1 to 5 $C_{1-10}$ alkyl. In an embodiment, $R^a$ and $R^b$ are each methyl, p and q are each independently 0 or 1, and $R^1$ is $C_{14}$ alkyl or phenyl.

Examples of bisphenol carbonate units derived from bisphenols (3) wherein $X^a$ is a substituted or unsubstituted $C_{3-18}$ cycloalkylidene include the cyclohexylidene-bridged, alkyl-substituted bisphenol of formula (4e)

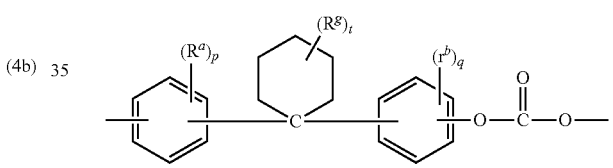

(4e)

wherein $R^a$ and $R^b$ are each independently $C_{1-12}$ alkyl, $R^g$ is $C_{1-12}$ alkyl, p and q are each independently 0 to 4, and t is 0 to 10. In a specific embodiment, at least one of each of $R^a$ and $R^b$ are disposed meta to the cyclohexylidene bridging group. In an embodiment, $R^a$ and $R^b$ are each independently $C_{14}$ alkyl, $R^g$ is $C_{14}$ alkyl, p and q are each 0 or 1, and t is 0 to 5. In another specific embodiment, $R^a$, $R^b$, and $R^g$ are each methyl, r and s are each 0 or 1, and t is 0 or 3, specifically 0.

Examples of other bisphenol carbonate units derived from bisphenol (3) wherein $X^b$ is a substituted or unsubstituted $C_{3-18}$ cycloalkylidene include adamantyl units (4f) and units (4g)

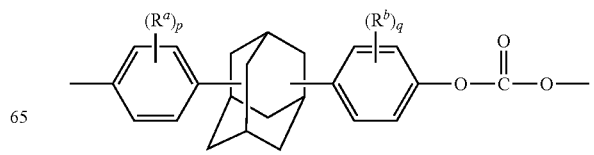

(4f)

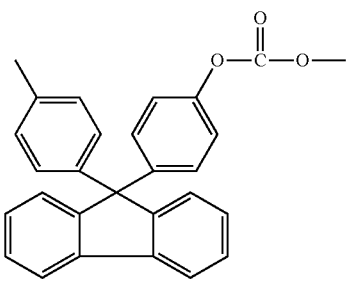

(4g)

wherein $R^a$ and $R^b$ are each independently $C_{1-12}$ alkyl, and p and q are each independently 1 to 4. In a specific embodiment, at least one of each of $R^a$ and $R^b$ are disposed meta to the cycloalkylidene bridging group. In an embodiment, $R^a$ and $R^b$ are each independently $C_{1-3}$ alkyl, and p and q are each 0 or 1. In another specific embodiment, $R^a$, $R^b$ are each methyl, p and q are each 0 or 1. Carbonates containing units (4a) to (4g) are useful for making polycarbonates with high glass transition temperatures ($T_g$) and high heat distortion temperatures.

Other useful aromatic dihydroxy compounds of the formula HO—$R^1$—OH include compounds of formula (6)

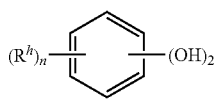

(6)

wherein each $R^h$ is independently a halogen atom, a $C_{1-10}$ hydrocarbyl such as a $C_{1-10}$ alkyl group, a halogen-substituted $C_{1-10}$ alkyl group, a $C_{6-10}$ aryl group, or a halogen-substituted $C_{6-10}$ aryl group, and n is 0 to 4. The halogen is usually bromine.

Some illustrative examples of specific aromatic dihydroxy compounds include the following: 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis(hydroxyphenyl)cyclopentane, 1,1-bis(4-hydroxyphenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantane, alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalimide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like, or combinations comprising at least one of the foregoing dihydroxy compounds.

Specific examples of bisphenol compounds of formula (3) include 1,1-bis(4-hydroxyphenyl) methane, 1,1-bis(4-hydroxyphenyl) ethane, 2,2-bis(4-hydroxyphenyl) propane (hereinafter "bisphenol A" or "BPA"), 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-2-methylphenyl) propane, 1,1-bis(4-hydroxy-t-butylphenyl) propane, 3,3-bis(4-hydroxyphenyl) phthalimidine, 2-phenyl-3,3-bis(4-hydroxyphenyl) phthalimidine (PPPBP), and 1,1-bis(4-hydroxy-3-methylphenyl)cyclohexane (DMBPC). Combinations comprising at least one of the foregoing dihydroxy compounds can also be used. In one specific embodiment, the polycarbonate is a linear homopolymer derived from bisphenol A, in which each of $A^1$ and $A^2$ is p-phenylene and $Y^1$ is isopropylidene in formula (2).

The polycarbonates can have an intrinsic viscosity, as determined in chloroform at 25° C., of 0.3 to 1.5 deciliters per gram (dl/g), specifically 0.45 to 1.0 dl/g. The polycarbonates can have a weight average molecular weight of 10,000 to 200,000 Daltons, specifically 20,000 to 100,000 Daltons, as measured by gel permeation chromatography (GPC), using a crosslinked styrene-divinylbenzene column and calibrated to polycarbonate references. GPC samples are prepared at a concentration of 1 mg per ml, and are eluted at a flow rate of 1.5 ml per minute.

In an embodiment, the polycarbonate has flow properties useful for the manufacture of thin articles. Melt flow rate (often abbreviated MFR) measures the rate of extrusion of a thermoplastic through an orifice at a prescribed temperature and load. Combinations of polycarbonates of different flow properties can be used to achieve the overall desired flow property. A high molecular weight aromatic polycarbonate having a relatively high weight average molecular weight can be combined with a relatively low molecular weight aromatic polycarbonate, with a difference of 1,000 to 50,000, specifically 2,000 to 25,000 g/mol. For example, a high molecular weight aromatic polycarbonate having a weight average molecular weight of 27,000 to 100,000 can be combined with a relatively low molecular weight aromatic polycarbonate having a weight average molecular weight of less than 27,000, for example 15,000 to 25,000.

"Polycarbonates" includes homopolycarbonates (wherein each $R^1$ in the polymer of formula (1) is the same), copolymers comprising different $R^1$ moieties in the carbonate ("copolycarbonates"), copolymers comprising carbonate units and other types of polymer units, such as ester units, and combinations comprising at least one of homopolycarbonates and/or copolycarbonates.

Polycarbonates can be manufactured by processes such as interfacial polymerization and melt polymerization. Although the reaction conditions for interfacial polymerization can vary, an process generally involves dissolving or dispersing a dihydric phenol reactant in aqueous caustic soda or potash, adding the resulting mixture to a water-immiscible solvent medium, and contacting the reactants with a carbonate precursor in the presence of a catalyst such as triethylamine and/or a phase transfer catalyst, under controlled pH conditions, e.g., 8 to 12. The most commonly used water immiscible solvents include methylene chloride, 1,2-dichloroethane, chlorobenzene, toluene, and the like.

Carbonate precursors include a carbonyl halide such as carbonyl bromide or carbonyl chloride, or a haloformate such as a bishaloformates of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors can also be used. In an embodiment, an interfacial polymerization reaction to form carbonate linkages uses phosgene as a carbonate precursor, and is referred to as a phosgenation reaction.

Among the phase transfer catalysts that can be used are catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is Cl$^-$, Br$^-$, a $C_{1-8}$ alkoxy group or a $C_{6-18}$ aryloxy group. An effective amount of a phase transfer catalyst can be 0.1 to 10 wt. % based on the weight of bisphenol in the phosgenation mixture. In another embodiment an effective amount of phase transfer catalyst can be 0.5 to 2 wt. % based on the weight of bisphenol in the phosgenation mixture.

All types of polycarbonate end groups are contemplated as being useful in the polycarbonate composition, provided that such end groups do not significantly adversely affect desired properties of the compositions.

Branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl) alpha, alpha-dimethyl benzyl)phenol), 4-chloroformyl phthalic anhydride, trimesic acid, and benzophenone tetracarboxylic acid. The branching agents can be added at a level of 0.05 to 2.0 wt. %. Mixtures comprising linear polycarbonates and branched polycarbonates can be used.

A chain stopper (also referred to as a capping agent) can be included during polymerization. The chain stopper limits molecular weight growth rate, and so controls molecular weight in the polycarbonate. Chain stoppers include certain mono-phenolic compounds, mono-carboxylic acid chlorides, and/or mono-chloroformates. Mono-phenolic chain stoppers are exemplified by monocyclic phenols such as phenol and $C_1$-$C_{22}$ alkyl-substituted phenols such as p-cumyl-phenol, resorcinol monobenzoate, and p- and tertiary-butyl phenol; and monoethers of diphenols, such as p-methoxyphenol. Alkyl-substituted phenols with branched chain alkyl substituents having 8 to 9 carbon atom can be specifically mentioned. Certain mono-phenolic UV absorbers can also be used as a capping agent, for example 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, and the like.

Mono-carboxylic acid chlorides can also be used as chain stoppers. These include monocyclic, mono-carboxylic acid chlorides such as benzoyl chloride, $C_1$-$C_{22}$ alkyl-substituted benzoyl chloride, toluoyl chloride, halogen-substituted benzoyl chloride, bromobenzoyl chloride, cinnamoyl chloride, 4-nadimidobenzoyl chloride, and combinations thereof; polycyclic, mono-carboxylic acid chlorides such as trimellitic anhydride chloride, and naphthoyl chloride; and combinations of monocyclic and polycyclic mono-carboxylic acid chlorides. Chlorides of aliphatic monocarboxylic acids with less than or equal to 22 carbon atoms are useful. Functionalized chlorides of aliphatic monocarboxylic acids, such as acryloyl chloride and methacryoyl chloride, are also useful. Also useful are mono-chloroformates including monocyclic, mono-chloroformates, such as phenyl chloroformate, alkyl-substituted phenyl chloroformate, p-cumyl phenyl chloroformate, toluene chloroformate, and combinations thereof.

Alternatively, melt processes can be used to make the polycarbonates. Generally, in the melt polymerization process, polycarbonates can be prepared by co-reacting, in a molten state, the dihydroxy reactant(s) and a diaryl carbonate ester, such as diphenyl carbonate, in the presence of a transesterification catalyst in a Banbury® mixer, twin screw extruder, or the like to form a uniform dispersion. Volatile monohydric phenol is removed from the molten reactants by distillation and the polymer is isolated as a molten residue. A specifically useful melt process for making polycarbonates uses a diaryl carbonate ester having electron-withdrawing substituents on the aryls. Examples of specifically useful diaryl carbonate esters with electron withdrawing substituents include bis(4-nitrophenyl)carbonate, bis(2-chlorophenyl)carbonate, bis(4-chlorophenyl)carbonate, bis(methyl salicyl)carbonate, bis(4-methylcarboxylphenyl) carbonate, bis(2-acetylphenyl) carboxylate, bis(4-acetylphenyl) carboxylate, or a combination comprising at least one of the foregoing esters. In addition, useful transesterification catalysts can include phase transfer catalysts of formula $(R^3)_4Q^+X$, wherein each $R^3$, Q, and X are as defined above. Transesterification catalysts include tetrabutylammonium hydroxide, methyltributylammonium hydroxide, tetrabutylammonium acetate, tetrabutylphosphonium hydroxide, tetrabutylphosphonium acetate, tetrabutylphosphonium phenolate, or a combination comprising at least one of the foregoing.

The polycarbonate composition further comprises an elastomer-modified graft copolymer comprising (i) an elastomeric (i.e., rubbery) polymer substrate having a $T_g$ less than or equal to 10° C., more specifically less than or equal to −10° C., or more specifically −40° to −80° C., and (ii) a rigid polymeric superstrate grafted to the elastomeric polymer substrate. As is known, elastomer-modified graft copolymers can be prepared by first providing the elastomeric polymer, then polymerizing the constituent monomer or monomers (comonomers) of the rigid phase in the presence of the elastomer to obtain the graft copolymer. The grafts can be attached as graft branches or as shells to an elastomer core. The grafted monomers or shell can merely physically encapsulate the core, or the shell can be partially or essentially completely grafted to the core, and can partially or essentially completely surround the core or elastomeric substrate.

Materials for use as the elastomer phase include, for example, conjugated diene rubbers; copolymers of a conjugated diene with less than or equal to 50 wt. % of a copolymerizable monomer; elastomeric copolymers of $C_{1-8}$ alkyl (meth)acrylates with butadiene and/or styrene; or combinations comprising at least one of the foregoing elastomers.

A specific elastomer-modified graft copolymer, for use as an impact modifier, is an acrylonitrile-butadiene-styrene (ABS) impact modifier wherein the butadiene substrate is prepared using above-described electrolytes, specifically using the above-described electrolytes and emulsifiers in combination. Other examples of elastomer-modified graft copolymers in addition to ABS include but are not limited to acrylonitrile-styrene-butyl acrylate (ASA), methyl (meth)acrylate-butadiene-styrene (MBS), methyl (meth)acrylate-acrylonitrile-butadiene-styrene (MABS), and acrylonitrile-ethylene-propylene-diene-styrene (AES).

Conjugated diene monomers for preparing the elastomer phase of an elastomer-modified graft copolymer include those of formula (7)

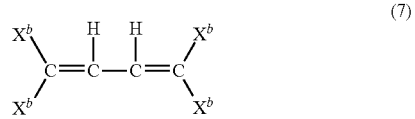

(7)

wherein each $X^b$ is independently hydrogen, $C_1$-$C_5$ alkyl, or the like. Examples of conjugated diene monomers that can be used are butadiene, isoprene, 1,3-heptadiene, methyl-1,3-pentadiene, 2,3-dimethyl-1,3-butadiene, 2-ethyl-1,3-pentadiene; 1,3- and 2,4-hexadienes, and the like, as well as combinations comprising at least one of the foregoing conjugated diene monomers. Specific conjugated diene homopolymers include polybutadiene and polyisoprene.

Copolymers of a conjugated diene rubber can also be used, for example those produced by aqueous radical emulsion polymerization of a conjugated diene and at least one monomer copolymerizable therewith. Monomers that are useful for copolymerization with the conjugated diene include monovinylaromatic monomers containing condensed aromatic ring structures, such as vinyl naphthalene, vinyl anthracene, and the like, or monomers of formula (8)

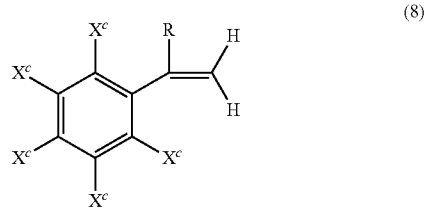

(8)

wherein each $X^c$ is independently hydrogen, $C_1$-$C_{12}$ alkyl, $C_3$-$C_{12}$ cycloalkyl, $C_6$-$C_{12}$ aryl, $C_7$-$C_{12}$ aralkyl, $C_7$-$C_{12}$ alkylaryl, $C_1$-$C_{12}$ alkoxy, $C_3$-$C_{12}$ cycloalkoxy, $C_6$-$C_{12}$ aryloxy, chloro, bromo, or hydroxy, and R is hydrogen, $C_1$-$C_5$ alkyl, bromo, or chloro. Monovinylaromatic monomers that can be used include styrene, 3-methylstyrene, 3,5-diethylstyrene, 4-n-propylstyrene, alpha-methylstyrene, alpha-methyl vinyl-toluene, alpha-chlorostyrene, alpha-bromostyrene, dichlorostyrene, dibromostyrene, tetra-chlorostyrene, and the like, and combinations comprising at least one of the foregoing compounds. Styrene and/or alpha-methylstyrene can be used as monomers copolymerizable with the conjugated diene monomer.

Other monomers that can be copolymerized with the conjugated diene are monovinylic monomers such as itaconic acid, acrylamide, N-substituted acrylamide or methacrylamide, maleic anhydride, maleimide, N-alkyl-, aryl-, or haloaryl-substituted maleimide, glycidyl (meth)acrylates, and monomers of the generic formula (9)

(9)

wherein R is hydrogen, $C_1$-$C_5$ alkyl, bromo, or chloro, and $X^c$ is cyano, $C_1$-$C_{12}$ alkoxycarbonyl, $C_1$-$C_{12}$ aryloxycarbonyl, hydroxy carbonyl, or the like. Examples of monomers of formula (8) include acrylonitrile, methacrylonitrile, alpha-chloroacrylonitrile, beta-chloroacrylonitrile, alpha-bromoacrylonitrile, acrylic acid, methyl (meth)acrylate, ethyl (meth)acrylate, n-butyl (meth)acrylate, t-butyl (meth)acrylate, n-propyl (meth)acrylate, isopropyl (meth)acrylate, 2-ethylhexyl (meth)acrylate, and the like, and combinations comprising at least one of the foregoing monomers. Monomers such as n-butyl acrylate, ethyl acrylate, and 2-ethylhexyl acrylate are commonly used as monomers copolymerizable with the conjugated diene monomer. Combinations of the foregoing monovinyl monomers and monovinylaromatic monomers can also be used.

(Meth)acrylate monomers for use in the elastomeric phase can be cross-linked, particulate emulsion homopolymers or copolymers of $C_{1-8}$ alkyl (meth)acrylates, in particular $C_{4-6}$ alkyl acrylates, for example n-butyl acrylate, t-butyl acrylate, n-propyl acrylate, isopropyl acrylate, 2-ethylhexyl acrylate, and the like, and combinations comprising at least one of the foregoing monomers. The $C_{1-8}$ alkyl (meth)acrylate monomers can optionally be polymerized in admixture with less than or equal to 15 wt. % of comonomers of formulas (7), (8), or (9), based on the total monomer weight. Comonomers include but are not limited to butadiene, isoprene, styrene, methyl methacrylate, phenyl methacrylate, phenethyl-methacrylate, N-cyclohexylacrylamide, vinyl methyl ether or acrylonitrile, and combinations comprising at least one of the foregoing comonomers. Optionally, less than or equal to 5 wt. % of a polyfunctional crosslinking comonomer can be present, based on the total monomer weight. Such polyfunctional crosslinking comonomers can include, for example, divinylbenzene, alkylenediol di(meth)acrylates such as glycol bisacrylate, alkylenetriol tri(meth)acrylates, polyester di(meth)acrylates, bisacrylamides, triallyl cyanurate, triallyl isocyanurate, allyl (meth)acrylate, diallyl maleate, diallyl fumarate, diallyl adipate, triallyl esters of citric acid, triallyl esters of phosphoric acid, and the like, as well as combinations comprising at least one of the foregoing crosslinking agents.

The elastomer phase can be polymerized using continuous, semi-batch, or batch processes. Specifically, emulsion polymerization of a monomer mixture comprising a diene or other unsaturated monomer for making the elastomer phase can be carried out in the presence of an electrolyte and surfactant.

A commonly used electrolyte is tetrasodium pyrophosphate (TSPP). Emulsion processes can use TSPP as a viscosity controlling agent. See for example, U.S. Pat. No. 6,784,253 to Vilasagar et al., hereby incorporated by reference. Residual amounts of TSPP can inherently act as a buffering agent to some extent, but would be insufficient to obtain the present method or polycarbonate composition. Specifically, the residual TSPP or the like would not be capable of effectively providing a buffer that can provide a pH of 6.4 to 4.9 in distilled water. Alternatively, the electrolyte can be selected from the group consisting of disodium phosphate, dipotassium phosphate, monosodium phosphate, monopotassium phosphate, trisodium phosphate, tripotassium phosphate, sodium bicarbonate, potassium bicarbonate, sodium carbonate, potassium carbonate, sodium nitrate, potassium nitrate, sodium sulfate, potassium sulfate, sodium bisulfate, potassium bisulfate, and combinations thereof. Subsequently, monomers can be grafted onto the latex of the elastomer phase/polymer ("diene polymer") to obtain an elastomer-modified graft copolymer.

The emulsifier or surfactant for preparing an elastomer-modified graft copolymer can include, for example, alkali metal salts of fatty acids, alkali metal carbonates, amines, ammonium salts, and other such materials. Specifically, the elastomer-modified graft copolymer can be prepared using salts of $C_6$-$C_{46}$ organic carboxylic acids, specifically alkali metal salts of $C_{6-30}$ fatty acids, for example, sodium stearate, lithium stearate, sodium oleate, potassium oleate, and the like, alkali metal carbonates, amines such as dodecyl dimethyl amine, dodecyl amine, and the like, and ammonium salts of amines. Alternatively, ionic sulfate, sulfonate or phosphate surfactants can be used in preparing the impact modifiers, particularly the elastomeric substrate portion of the impact modifiers.

Useful surfactants include, for example, $C_{1-22}$ alkyl or $C_{7-25}$ alkylaryl sulfonates, $C_{1-22}$ alkyl or $C_{7-25}$ alkylaryl sulfates, $C_{1-22}$ alkyl or $C_{7-25}$ alkylaryl phosphates, substituted silicates, or a combination comprising at least one of the foregoing, which compounds can be substituted or unsubstituted with further groups, including additional sulfonate, sulfate, phosphate, or silicate groups. The compounds can comprise alkyl groups having 1 to 20 carbon atoms, specifically 1 to 6 carbon atoms, and aryl groups having 6 to 12 carbon atoms. A specific surfactant is a $C_{6-16}$ alkyl sulfonate, specifically a $C_{8-12}$ alkyl sulfonate. Another specific surfactant is a substituted alkyl aryl sulfonate, specifically a substituted diaryloxide disulfonate, more specifically alkyl diphenyloxide disulfonate, in which a phenyl group is substituted with a phenoxy group substituted with a second sulfonate group and in which the aryl groups are substituted with alkyl groups.

Examples of such surfactants include, but are not limited thereto, sodium dodecyl benzene sulfonate, potassium octyl benzene sulfonate, sodium lauryl sulfate, sodium alkyl naphthyl sulfonates, calcium decyl benzene sulfonate, $C_8$-$C_{16}$ alkylated diphenylether sodium disulfonates, potassium hexyl phosphate, sodium decylphosphate, and mixtures thereof, and the like. An example of a dimethyl substituted diaryloxide disulfonate is commercially available under the trademark DOWFAX 2A1.

Before grafting to form the elastomer-modified graft copolymer, the elastomer portion or substrate, or diene polymer, can be agglomerated to increase the average particle size (for example, to an average particle size of 50 to 1000 nm), wherein monomers are grafted onto the agglomerated diene elastomer polymer. The grafting can occur in the presence of an initiator, redox system, and chain transfer agent to obtain the elastomer-modified graft copolymer. Typically the unagglomerated average particle size is about 30 to 150 nm, more specifically about 75 to 100 nm, and the agglomerated average particle size is about 200 to 400 nm, more specifically about 250 to 350 nm.

The particle size of the elastomer substrate is not critical. For example, an average particle size of 0.001 to 25 micrometers (1 to 25000 nanometers), specifically 0.01 to 15 micrometers (10 to 15000 nm), or even more specifically 0.1 to 8 micrometers (100 to 8000 nm) can be used. In one embodiment, the a polybutadiene elastomer substrate can be agglomerated to an average particle size of about 50 to 1000 nm, specifically 100 to 600 nm. Particle size can be measured by simple light transmission methods (Dynamic Light scattering or DLS), which can be estimated also by capillary hydrodynamic chromatography (CHDF). The elastomer phase can be a particulate, moderately cross-linked conjugated butadiene or $C_{4-6}$ alkyl acrylate rubber. In one embodiment, a gel content greater than 70% is used. Specifically, combinations of butadiene with styrene and/or $C_{4-6}$ alkyl acrylate rubbers can be used.

The elastomeric phase can comprise 5 to 95 wt. % of the total graft copolymer, more specifically 20 to 90 wt. %, and even more specifically 40 to 85 wt. % of the elastomer-modified graft copolymer, the remainder being the rigid graft phase. In one embodiment, the weight ratio of the elastomer substrate, or diene polymer, to the superstrate, or graft polymer, is about 4:1 to 1:4, more specifically 2:1 to 1:2.

The rigid phase of the elastomer-modified graft copolymer can be formed by graft polymerization of one or more monomers, including a combination comprising a monovinylaromatic monomer and optionally at least one comonomer in the presence of at least one elastomeric polymer substrate. The above-described monovinylaromatic monomers of formula (8) can be used in the rigid graft phase, including styrene, alpha-methyl styrene, halogenated-styrene such as dibromostyrene, vinyltoluene, vinylxylene, butylstyrene, para-hydroxystyrene, methoxystyrene, or the like, or combinations comprising at least one of the foregoing monovinylaromatic monomers. Useful comonomers include, for example, the above-described monovinylic monomers and/or monomers of the general formula (9). In an embodiment, R in Formula (9) is hydrogen or $C_1$-$C_2$ alkyl, and $X^c$ is cyano or $C_1$-$C_{12}$ alkoxycarbonyl. Specific comonomers for use in the rigid phase include acrylonitrile, methacrylonitrile, methyl (meth) acrylate, ethyl (meth)acrylate, n-propyl (meth)acrylate, isopropyl (meth)acrylate, and the like, and combinations comprising at least one of the foregoing comonomers.

The relative ratio of monovinylaromatic monomer and comonomer in the rigid graft phase can vary widely depending on the type of elastomer substrate, type of monovinylaromatic monomer(s), type of comonomer(s), and the desired properties of the impact modifier. The rigid phase can generally comprise less than or equal to 100 wt. % of monovinyl aromatic monomer, specifically 30 to 100 wt. %, more specifically 50 to 90 wt. % monovinylaromatic monomer, with the balance of the rigid phase being comonomer(s).

In one embodiment, the elastomer-modified graft copolymer is made by a process in which an agglomerated polybutadiene latex is grafted with a monomer mixture comprising styrene and optionally comprising a monomer selected from the group consisting of methacrylate, methyl methacrylate, acrylonitrile, and combinations thereof. In the monomer mixture, styrene and acrylonitrile can be in a ratio of 5:1 to 1:1, specifically, 4:1 to 2:1, more specifically 3.4:1 to 1.5:1 by weight ratio. Thus, for example, the graft superstrate can be derived from 10 to 50%, specifically 15 to 25% by weight of acrylonitrile monomer.

In one embodiment, the graft superstrate formed by the monomer mixture is capable of readily wetting the polycarbonate in the polycarbonate composition, in which the elastomeric substrate comprises repeat units derived from butadiene and the non-elastomeric superstrate is a copolymer comprising repeat units derived from a monovinylaromatic monomer. The elastomer phase, or diene polymer, can comprise 20% to 80% by weight, specifically about 50% by weight of the elastomer-modified graft copolymer.

Following grafting of the elastomer phase, the method for preparing the elastomer-modified graft copolymer, for use in the polycarbonate composition, can further comprise coagulating the elastomer-modified graft copolymer with a salt and then concentrating and drying the coagulated elastomer-modified graft copolymer, as will be readily appreciated by one of ordinary skill.

Coagulants can include acids having a $pK_a$ of less than 5.0, specifically less than 3.0, more specifically less than 2.0. Accordingly, the acid can be a mineral acid having a hydrogen atom that completely ionizes in water. The acid coagulant can be an oxoacid (also referred to as an oxyacid), typically a strong acid, i.e., an acid that completely ionizes in water (at least the first hydrogen proton). Specifically, the $pK_a$ of the strong acid is below 2.0. Strong acids include, for example, hydrochloric acid (HCl), hydroiodic acid (HI), hydrobromic acid (HBr), hydrofluoric acid (HF), perchloric acid ($HClO_4$), nitric acid ($HNO_3$), nitrous acid ($HNO_2$), chromic acid ($H_2CrO_4$), and sulfuric acid ($H_2SO_4$), sulfurous acid ($H_2SO_3$), phosphoric acid ($H_3PO_4$), trifluoromethanesulfonic acid ($CF_3SO_3H$), and alkylsulfonic acid ($CH_3SO_3H$). Specifically, strong acids can include nitrogen-containing or sulfur-containing strong acids, for example, nitric acid ($HNO_3$), nitrous acid ($HNO_2$), sulfuric acid ($H_2SO_4$), and sulfurous acid ($H_2SO_3$). More specifically, a mineral acid such as sulfuric acid can be used as a coagulant.

The elastomer-modified graft copolymer can be admixed with an aromatic polycarbonate optionally further in combination with a polymeric flow promoter. The polymeric flow promoter can readily blend with the elastomer-modified graft copolymer and increase its melt flow rate without adversely affecting the desired properties of the composition.

A polymeric flow promoter can comprise repeat units derived from monomers selected from the group consisting of methyl (meth)acrylate, styrene, acrylonitrile, alpha-methyl styrene, and combinations thereof. For example, polymeric flow promoters can include styrene-acrylonitrile copolymers, poly(methyl methacrylate), polystyrene, methyl methacrylate-styrene-acrylonitrile copolymer, poly(alpha methyl styrene), and combinations thereof. Specifically, the polycarbonate composition can comprise a flow promoter that is a styrene-acrylonitrile copolymer.

Depending on the amount of elastomer-modified graft copolymer present, the polymeric flow promoter can form a separate matrix or continuous phase. The polymeric flow promoter can comprise ungrafted rigid polymer or "graft copolymer" that is simultaneously obtained along with the elastomer-modified graft copolymer. Specifically, the polymeric flow promoter can be produced at the same time as the elastomer-modified graft copolymer by using excess monomers from the graft superstrate. Alternatively, the polymeric flow promoter can be prepared or obtained independently and introduced to the elastomer-modified graft copolymer later, for example, during compounding of the elastomer-modified graft copolymer with the aromatic polycarbonate. It can be prepared using emulsion, suspension or bulk/mass polymerization techniques.

In one embodiment, a polymeric flow promoter is obtained during preparation of the elastomer-modified graft copolymer composition, wherein "free" styrene-acrylonitrile copolymer ("free SAN") that is not grafted onto another polymeric chain occurs. Specifically, the free styrene-acrylonitrile copolymer can have a molecular weight of 50,000 to 200,000 Daltons on a polystyrene standard molecular weight scale and can comprise various proportions of styrene to acrylonitrile. For example, free SAN can comprise 75 weight percent styrene and 25 weight percent acrylonitrile based on the total weight of the free SAN copolymer. Free SAN can optionally be present by virtue of the addition of another grafted rubber impact modifier in the composition that contains free SAN, and/or free SAN can by present independent of the preparation of all impact modifiers in the composition.

The impact resistant polycarbonate composition can comprise, in admixture, about 20 to about 90 weight percent of the aromatic polycarbonate and about 80 to about 10 weight percent of the combined elastomer-modified graft copolymer and optional polymeric flow promoter, based on the total weight of polycarbonate, elastomer-modified graft copolymer and optional polymeric flow promoter. Specifically, the polycarbonate composition can comprise, in admixture, about 40 to about 80 weight percent of the aromatic polycarbonate and about 60 to about 20 weight percent of, in combination, elastomer-modified graft copolymer and optional polymeric flow promoter, based on the total weight of polycarbonate, elastomer-modified graft copolymer and optional polymeric flow promoter.

More specifically, the polycarbonate composition can comprise, in admixture, about 48 to about 75 weight percent of the aromatic polycarbonate and about 52 to about 25 weight percent of (in total) elastomer-modified graft copolymer and optional polymeric flow promoter, based on the total weight of polycarbonate, elastomer-modified graft copolymer and optional polymeric flow promoter.

The ratio of elastomer-modified graft copolymer to optional polymeric flow promoter, if present, can be 3:1 to 1:3, specifically 2:1 to 1:2, more specifically 1.5:1 to 1:1.5. Typically, 40 to 95 wt. % elastomer-modified graft copolymer can be combined with 5 to 65 wt. % polymeric flow promoter (for example, graft copolymer), based on the total weight of both. In another embodiment, 50 to 85 wt. %, more specifically 75 to 85 wt. % of the elastomer-modified graft copolymer is combined with 15 to 50 wt. %, more specifically 15 to 25 wt. % polymeric flow promoter such as separate graft copolymer, based on the total weight of both. For example, the polycarbonate composition can comprise styrene-acrylonitrile copolymer (free SAN) present in the amount of 1 to 30 weight percent, based on the total weight of polycarbonate, elastomer-modified graft copolymer, and styrene-acrylonitrile copolymer.

In view of the above, an impact resistant polycarbonate composition having improved resistance to polymer degradation can comprise, in admixture, about 48 to about 75 weight percent of an aromatic polycarbonate and about 52 to about 25 weight percent of a elastomer-modified graft copolymer polymer and optional polymeric flow promoter, based on the total weight of polycarbonate, elastomer-modified graft copolymer, and polymeric flow promoter, wherein the elastomer-modified graft copolymer is prepared by an emulsion polymerization process. In addition to the polycarbonate, elastomer-modified graft copolymer impact modifier, and buffering agents, the composition can further include various additives ordinarily incorporated into polymer compositions of this type, with the proviso that the additives are selected so as to not significantly adversely affect the desired properties of the composition. Combinations of additives can be used. The additives (including optional fillers) can be generally present in an amount from 0.005 to 20 wt. %, specifically 0.01 to 10 wt. %, more specifically 0.1 to 5 wt. %, based on the total weight of the composition. Thus, the amount of optional filler (specifically talc) can be less than 10 weight percent of the total composition, more specifically less 5 weight percent, most specifically less than 1 weight percent of filler. For example, essentially no talc may be present in the composition. Such compositions, without talc or other such fillers, are especially useful in making molded interior automotive parts, whereas exterior automotive parts in which dimensional stability is particularly desirable can often comprise substantial amounts of talc.

For example, antioxidant additives can include organophosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite; alkylated monophenols or polyphenols; alkylated reaction products of polyphenols with dienes, such as tetrakis[methylene(3,5-di-tert-butyl-4-hydroxyhydrocinnamate)]methane; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl) propionate; amides of beta-(3,5-di-tert-butyl-4-hydroxyphenyl)-propionic acid, or combinations comprising at least one of the foregoing antioxidants. Antioxidants can be used in amounts of 0.01 to 0.1 parts by weight, based on 100 parts by weight of the total polymer in the composition.

The final polycarbonate composition having improved resistance to polymer degradation can be prepared by a method comprising carrying out emulsion polymerization of a monomer mixture comprising a diene monomer, thereby forming an elastomer polymer; grafting monomers onto the elastomer polymer of the latex to obtain an elastomer-modified graft copolymer; and compounding the aromatic polycarbonate and the elastomer-modified graft copolymer in the presence of a buffer comprising a metallic salt of phosphoric acid comprising potassium cations. Specifically, the metallic salt of phosphoric acid comprises a weak acid form and a conjugate base form and provides a pH of 6.3 to 7.0, specifically 6.4 to 6.9, in distilled water To prepare the final impact resistant polycarbonate composition for use in products, the components can be combined by any known methods. Typically, there are two distinct mixing steps: a premixing step and a melt mixing ("melt blending") step.

In the premixing step, the dry ingredients are mixed together. The premixing is typically performed using a tumbler mixer or ribbon blender. However, if desired, the premix may be manufactured using a high shear mixer such as a Henschel® mixer or similar high intensity device. Preferably, all of the components, other than the buffer, are freed from as much water as possible.

The premixing is typically followed by melt mixing in which the premix is melted and mixed again as a melt. Alternatively, the premixing may be omitted, and raw materials may be added directly into the feed section of a melt mixing device, preferably via multiple feeding systems. In melt mixing, the ingredients are typically melt kneaded in a single screw or twin screw extruder, a Banbury mixer, a two roll mill, or similar device. The examples are extruded using a twin screw type extruder, where the mean residence time of the material is from about 20 seconds to about 30 seconds, and where the temperature of the different extruder zones is from about 200° C. to about 290° C.

In a specific embodiment, the components of the impact resistant polycarbonate composition are blended by placing them into an extrusion compounder to produce molding pellets or the like. Alternatively, the composition and any optional components can also be mixed and directly molded, e.g., by injection or transfer molding techniques. In one embodiment, compounding is carried out to ensure that the residence time in the machine is short; the temperature is carefully controlled; the friction heat is utilized; and an intimate blend between the components is obtained.

Specifically, the aromatic polycarbonate can be compounded with the elastomer-modified graft copolymer and the phosphate buffer, after dry mixing, in an extruder.

The buffering composition, comprising metallic salts of phosphoric acid, can be added in powder or solution form. A convenient process for buffer treatment uses an aqueous solution of the buffering compounds, for example, a water solution containing 20 to 70 weight/volume percent, specifically about 40 to 60 weight/volume percent of buffering compounds. Thus, for example, a 50% solution (w/v)% solution of the buffer salts can be used.

In one embodiment, the components can be pre-compounded, pelletized, and then molded. For example, a single screw extruder can be fed with a dry blend of the ingredients including the buffer, the screw employed having a long transition section to ensure proper melting. Alternatively, a twin screw extruder with intermeshing co-rotating screws can be fed with resin and additives at the feed port and optional reinforcing additives (and other additives) can be fed downstream. In either case, a generally suitable melt temperature will be 200° C. to 300° C. The pre-compounded composition can be extruded and cut up into molding pieces such as conventional granules, pellets, and the like by standard techniques. The composition can then be molded in any equipment conventionally used for thermoplastic compositions such as, for example, a Newbury or van Dorn type injection molding machine with cylinder temperature of 200° C. to 300° C., specifically 230° C. to 280° C., and mold temperature at 55° C. to 95° C.

The impact resistant polycarbonate compositions of the present invention can advantageously obtain a balance of properties characterized by, after aging in an oven for 1000 hours at 90±2° C. and 95±3% RH (Relative Humidity), the melt flow rate (MFR) of the polycarbonate composition not changing by more than 5.0 g/10 minutes units measured in accordance with ISO 1133 standard at 230° C. using a 3.8 kg load and 300 sec dwell time. Furthermore, the composition can also be characterized by, after aging in an oven for 1000 hours at 90±2° C. and 95±3% RH, the polycarbonate composition exhibiting a change in the melt flow rate (MFR) that is at least 5 g/10 minutes less than, specifically at least 6 g/10 minutes less than, more specifically about 10 g/10 minutes less than the change in the same composition when the buffer, comprising a potassium salt of phosphoric acid, is omitted. The melt flow rate (MFR) is measured in accordance with ISO 1133 standard at 230° C. using a 3.8 kg load and 300 sec dwell time.

The Melt flow rate (MFR) of a polymer composition is a measure of the extrusion rate of the polymeric melt through a die with a specified length and diameter under set conditions of temperature and loads, as determined according to ISO 1133, which is hereby incorporated by reference. This melt flow rate technique is based on the principle that flow increases with decreasing polymer viscosity for a given temperature and load test condition. A higher MFR value indicates a lower viscosity under an applied stress (load or weight in kg) and generally increases as the molecular weight of a particular type of polymer decreases. Thus, since decreasing molecular weight is indicative of polymer degradation due to hydrolysis, heat and/or transesterification, an increase in MFR can be viewed as corresponding to a drop in weight average molecular weight ($M_w$) and an increase in polymer degradation.

Melt flow rate methods are described in "Rheology—Principles, Measurements and Applications" by C. W. Macosko (ISBN 0-471-18575-2), "Rheological Techniques" by R. W. Whorlow (ISBN 0-13-775370-5), and "Flow Properties of Polymer Melts" by J. A. Brydson, (ISBN 0-59-205458-6), all three of which are hereby incorporated by reference.

The polycarbonate composition can exhibit, after aging in an oven for 1000 hours at 90±2° C. and 95±3% RH, a molecular weight retention of least 60 percent of the molecular weight of the polycarbonate is retained, measured by Gel Permeation Chromatography (GPC).

The polycarbonate composition can exhibit, after aging the polycarbonate composition in an oven for 1000 hours at 90±2° C. and 95±3% RH, a molecular weight retention of the polycarbonate that is at least 10 percent greater than the same composition in which the metallic salt of phosphoric acid is not present.

Thus, for example in one embodiment, the composition comprises An impact resistant polycarbonate composition having improved resistance to polymer degradation comprising 48 to 75 weight percent of an aromatic polycarbonate in admixture with 25 to 52 weight percent of an elastomer-modified graft copolymer that is the product of an emulsion polymerization process, wherein the composition is a product of compounding the aromatic polycarbonate and the elastomer-modified graft copolymer in the presence of a buffer comprising metallic salts of phosphoric acid that comprises potassium cations, wherein the buffer comprises a weak acid form and a conjugate base form and is capable of providing a pH of 6.3 to 7.0, specifically 6.4 to 6.9, in distilled water, wherein the metallic salts of phosphoric acid are present in an amount that provides phosphorus in the amount of 0.0044 to 0.0088 mol/kg, based on the weight of the composition, wherein the greater than 50 mole percent of cations in said metallic salts are potassium cations, and wherein after aging in an oven for 1000 hours at 90±2° C. and 95±3% RH, the melt flow rate (MFR) of the polycarbonate composition does not change by more than 5.0 g/10 minutes units measured in accordance with ISO 1133 standard at 230° C. using a 3.8 kg load and 300 sec dwell time and/or at least 80 percent of the molecular weight of the polycarbonate is retained, measured by Gel Permeation Chromatography (GPC).

The final polycarbonate composition can be shaped into an article by various techniques known in the art such as injection molding, extrusion, injection blow molding, and gas assist molding. The compositions are thus useful in the manufacture of non-electrical, electrical, or electronic parts. Articles can include the exterior or interior components of aircraft, automotive, truck, motorcycle, or other vehicles (generically "automotive parts"), including panels, quarter panels, rocker panels, trim fenders, deck lids, trunk fairings and lids, hoods, bumpers, fascia, grilles, mirror housings, cladding, wheel covers, hubcaps, door components, spoilers, instrument panels, instrument panel retainers, interior trim, emblem logos, exterior trim, and door handles, tank flaps, rocker panels, side panels, window frames, head or tail lamps, roof racks, and running boards. Articles can also include enclosures for a wide variety of electrical and telecommunication devices, for example, housing for electronic components, including power tools, home appliances, or computer components, computer accessories such as printers, copiers, or keyboards, and telecommunication devices, for example, mobile phones, radios, or fax machines. Still further applications can include, but are not limited to, building and construction applications, display items, signs, and like applications.

This invention is further illustrated by the following Examples, which are not intended to limit the claims.

EXAMPLES

Materials

In the Tables below, compositions are given by weight based on the total weight of the composition, unless indicated otherwise. The materials used for the examples and comparative Examples are shown in Tables 1 and 2.

TABLE 1

| Component | Chemical Description [CAS Ref. No.] | Supplier |
|---|---|---|
| PC1 | Bisphenol A polycarbonate homopolymer resin, interfacial polymerization, $M_w$ about 21,900 g/mol [CAS: 25971-63-5] | SABIC Innovative Plastics LEXAN® ML5221-111 |
| PC2 | Bisphenol A polycarbonate 100 grade homopolymer resin, interfacial polymerization, $M_w$ about 29,500 g/mol [CAS: 25971-63-5] | SABIC Innovative Plastics LEXAN® ML4505-111 |
| ABS | Acrylonitrile-butadiene-styrene graft copolymer, (50% butadiene content) | SABIC Innovative Plastics |
| SAN | High flow styrene-acrylonitrile copolymer, 6.2 g/10 min MFR at 190° C./2.16 kg, 25% AN monomer mole ratio. | SABIC Innovative Plastics |
| STAB1 | Tris(2,4-di-t-butylphenyl)phosphite, stabilizer | CIBA/BASF IRGAFOS 168 |
| STAB2 | Octadecyl 3-(3,5-di-tert-butyl-4-hydroxyphenyl)propionate, stabilizer [CAS: 2083-79-3] | CIBA/BASF IRGANOX 1076 |
| STAB3 | Pentaerythritol betalaurylthiopropionate, stabilizer | Haruno Sangyo Kaisha Ltd. SEENOX 412S |
| MR | Pentaerythritol tetrastearate, mold release agent | LONZA Spa GLYCOLUBE P |

TABLE 2

| Component | Chemical Description | Formula |
|---|---|---|
| MSP | Monosodium phosphate monohydrate | $NaH_2PO_4 \cdot H_2O$ |
| DSP | Disodium phosphate heptahydrate | $Na_2HPO_4 \cdot 7H_2O$ |
| MPP | Monopotassium phosphate | $KH_2PO_4$ |
| DPP | Dipotassium phosphate trihydrate | $K_2HPO_4 \cdot 3H_2O$ |
| CAPP | Calcium acid pyrophosphate | $CaH_2P_2O_7$ |
| CPP | Calcium pyrophosphate | $Ca_2P_2O_7$ |
| MCP | Monocalcium phosphate monohydrate | $Ca(H_2PO_4)_2 \cdot H_2O$ |
| CPD | Calcium phosphate dibasic | $CaHPO_4$ |
| LPM | Lithium phosphate monobasic | $LiH_2PO_4$ |
| LP | Lithium Phosphate | $Li_3PO_4$ |
| APM | Aluminum phosphate monobasic | $Al(H_2PO_4)_3$ |

TABLE 2-continued

| Component | Chemical Description | Formula |
|---|---|---|
| MZP | Monozinc phosphate | $Zn(H_2PO_4)_2$ |
| SHMP | Sodium hexametaphosphate | $(NaPO_3)_n$ (65-70% $P_2O_5$) |

Methods of Preparation

The following is a theoretical preparation of a typical high rubber graft copolymer, specifically an acrylonitrile-butadiene-styrene elastomer-modified graft copolymer. A butadiene elastomer needed for the ABS elastomer-modified graft copolymer is synthesized by a standard batch emulsion process using a dimer acid as a surfactant, tetrasodium pyrophosphate ($Na_4P_2O_7$) as an electrolyte to control latex viscosity, potassium persulfate as initiator, and t-dodecylmercaptan (TDDM) as chain-transfer agent. The resulting polybutadiene latex, which is about 80 nm in average particle size, is pressure agglomerated to about 300 nm average particle size as measured by dynamic laser light scattering (DLLS).

The agglomerated polybutadiene latex is charged at 50 to 60 parts by weight and grafted with 40 to 50 parts by weight of styrene and acrylonitrile monomer (in a 3:1 weight ratio) in a semi-batch process, using cumene hydroperoxide as initiator, ferrous sulfate)/(disodium ethylenediamine tetraacetate)/(sodiumformaldehyde sulfoxylate as a redox system, and TDDM as chain-transfer agent. To the resulting elastomer-modified graft copolymer latex an anti-oxidant emulsion comprising IRGANOX 1076 phenolic anti-oxidant was added. The resulting elastomer-modified graft copolymer is then coagulated with sulfuric acid. The coagulated elastomer-modified graft copolymer is centrifuged and filtered, and then dried in a fluid bed drier.

On the day of extrusion, the elastomer-modified graft copolymer, styrene-acrylonitrile copolymer (SAN), polycarbonate (PC) and phosphate buffer were dry blended for about 15 minutes using a paint shaker Aqueous phosphate buffers were pre-dissolved in water and optimized for distributive mixing and breaking up of all crystallites. Phosphate buffers in powder form were used in a fine ground state. The dry blended components were extruded in a twin-screw extruder (TSE) employing a 30 mm Werner Pfleiderer co-rotating 9-barrel TSE with a vacuum vented mixing screw, at a barrel and die head temperature between 240 and 275° C. and a screw speed of 300 to 500 revolutions per minute (rpm). The extrudate was cooled through a water bath prior to pelletizing. Test parts were injection molded on an Engel® 110T-molding machine with a set temperature of approximately 240 to 265° C.

Testing

Several different tests were conducted for determining hydrolytic stability. In a first set of tests extruded pellets (FIG. 1) and molded Izod bars (FIG. 2) were autoclaved at 110° C. and 100% relative humidity for 11 days and polycarbonate molecular weight retention, compared to unaged pellets or parts, was determined. The polycarbonate molecular weight measurement was conducted by Gel Permeation Chromatography (GPC). Molecular weight and polydispersity was reported relative to monodisperse polystyrene standards.

In a second set of tests, standard ISO T-bars (tensile bars) were molded and aged in an oven for 1000 hours maintained at 90±2° C. and 95±3% relative humidity (RH).

Specifically, the degradation of the material after exposure (aging) to high temperature and high humidity was measured using the Daimler Chrysler Laboratory Procedure LP-463DB-03-01, in which the molded materials were conditioned in a controlled atmosphere of 23±2° C. and 50±5 relative humidity for not less than 24 hours. The delta MFR (in grams/10 minutes) is the final MFR (aged) minus the initial MFR (unaged). The PC molecular weight measurement was conducted by GPC on ISO T-bars.

The MFR was measured in accordance with ISO 1133 standard at 230° C., 3.8 kg load and 300 s dwell time. The measurement was made on pellets cut from aged and unaged tensile bars (Type A specimen as defined in ISO 3167). The melt flow rate (MFR) of the bars, before and after aging, was measured. A shift in MFR (delta MFR or Δ MFR) of not more than 5.0 g/10 minutes after aging represented the desired hydrostability.

As mentioned above, a higher MFR value indicates a lower viscosity under an applied stress (load or weight in kg) and generally increases as the molecular weight of a polymer decreases. Thus, since decreasing molecular weight is indicative of polymer degradation due to hydrolysis, heat, and/or transesterification, then an increase in MFR can be viewed as corresponding to a drop in weight average ($M_w$) or number average (MO molecular weight and an increase in polymer degradation.

Comparative Examples 1-8 and Examples 1-10

The purpose of the Examples and Comparative Examples is to demonstrate the unique performance of impact-modified polycarbonate according to the present invention with respect to hydrostability, as characterized by a shift in the melt flow rate and/or the percent polycarbonate molecular weight retention in response to aging, under conditions of elevated heat and high humidity.

The formulation used is shown in Table 3 below, in which the polycarbonate (PC) and elastomer-modified graft copolymer (ABS) levels were maintained the same in all examples.

TABLE 3

| Component | Weight Percent |
|---|---|
| PC1 | 41.63 |
| PC2 | 26.62 |
| SAN | 12.8 |
| ABS | 18.2 |
| STAB 1 | 0.1 |
| STAB 2 | 0.3 |
| STAB 3 | 0.2 |
| MR | 0.15 |

The influence of buffer strength and cation forms on the polycarbonate molecular weight retention (e.g., an important parameter used to measure performance of hydrolytic stability) in impact modified polycarbonate blends was investigated, specifically high rubber graft ABS. Tables 4-6 correspond to three libraries of phosphate buffers selected on the basis of differences in cation forms and buffer strengths as well as the resulting buffer physical forms, including aqueous and powder forms. Solutions of phosphate buffers were prepared at a pH value of 6.8 or 6.5, since studies have demonstrated that polycarbonate exposed to pH conditions of 6.5-7.0 exhibited minimal hydrolytic degradation. The relative ratios of respective acid and base buffer forms comprised of the pH 6.8 or 6.5 solutions were determined using the Henderson-Hasselbalch equation as follows:

$$pH = pK_a + \log [\text{Base Form}(A^-)]/[\text{Acid Form}(HA)]$$

wherein $pKa_2 = 6.865$ for phosphoric acid. Due to the differences in solubility of phosphate salts in solutions at pH 6.8, either straight powders or 50% w/v aqueous solutions of the corresponding phosphate salts (e.g., with or without precipitates) were used as the physical forms for buffer additions to the formulation. Solution pH of the phosphate buffers were confirmed by pH meters to confirm their value of 6.8 or 6.5 (or in the case of DSP, 9.0).

In the first set of experiments, the compositions in Table 4 were tested. Specifically, Table 4 shows a phosphate buffer library selected on the basis of differences in cation forms, loading levels, and the resulting buffer physical forms. The details of the various buffering agents, different in each example or comparative example, are shown in Table 4. Comparative Examples C-1 to C-8, for example, used buffering agents comprising sodium, calcium, lithium, aluminum, and zinc cations, whereas Example 1 used a buffering agent comprising potassium cations. As described above, the hydrostability aging was performed using extruded pellets autoclaved at 110° C. and 100% relative humidity for 11 days.

buffer cation forms and strengths during compounding. The percent polycarbonate molecular weight retention was referenced with respect to the polycarbonate molecular weights of pellets prior to autoclaving. As expected, in the absence of phosphate buffers (i.e., control), significant polycarbonate degradation was observed (~40% polycarbonate MW retention) resulting from residual dimer and sulfuric acids as respective surfactant and coagulant. Similar behaviors were observed in blends with the addition of non-potassium based phosphate buffers, suggesting their minimal effects on polycarbonate molecular weight retention after autoclaving (~40-50%). In contrast, the added potassium phosphate buffers in polycarbonate/emulsion-ABS blends led to substantial improvement in polycarbonate molecular weight retention of the extruded pellets upon autoclaving (~80-90%). It is hypothesized that the enhanced hydrostability performance of the potassium phosphate buffer is the result of its largest cation size among the cation forms of buffers in the experiments. The influence of the potassium based buffer strengths, in combination with other added cation forms, on the retention of polycarbonate molecular weights for molded Izod bars upon 11 days autoclaving was next evaluated. Specifically, the compositions in Table 5 were tested. Table 5 shows the potassium based phosphate buffer library selected on the

TABLE 4

| Ex. No. | Buffer | Cation Form | Acid Form | Base Form | P Loading (mol/ 10 lbs) | Salt Loading (mol/kg) | pH | Physical Form |
|---|---|---|---|---|---|---|---|---|
| C-1A | MSP + DSP | $Na^+$ | $NaH_2PO_4 \cdot$ | $Na_2HPO_4 \cdot$ | 0.16 | 0.70 | 6.82 | 50% (w/v) |
| C-1B | 2 × (MSP + DSP) | | $H_2O$ (MSP) | $7H_2O$ (DSP) | 0.32 | 1.40 | | Aqueous |
| 1A | MPP + DPP | $K^+$ | $KH_2PO_4$ | $K_2HPO_4 \cdot$ | 0.16 | 0.63 | 6.82 | 50% (w/v) |
| 1B | 2 × (MPP + DPP) | | (MPP) | $3H_2O$ (DPP) | 0.32 | 1.26 | | Aqueous |
| C-2A | CAPP + CPP | $Ca^{2+}$ | $CaH_2P_2O_7$ | $Ca_2P_2O_7$ | 0.16 | 0.40 | N/A | Powder |
| C-2B | 2 × (CAPP + CPP) | | (CAPP) | (CPP) | 0.32 | 0.80 | | |
| C-3A | MCP + CPD | $Ca^{2+}$ | $Ca(H_2PO_4)_2 \cdot$ | $CaHPO_4$ | 0.16 | 0.46 | N/A | Powder |
| C-3B | 2 × (MCP + CPD) | | $H_2O$ (MCP) | (CPD) | 0.32 | 0.92 | | |
| C-4A | LPM + LP | $Li^+$ | $LiH_2PO_4$ | $Li_3PO_4$ (LP) | 0.16 | 0.38 | 6.82 | 50% (w/v) |
| C-4B | 2 × (LPM + LP) | | (LPM) | | 0.32 | 0.75 | | Aqueous w ppt. |
| C-5A | APM + DSP | $Al^{3+}$ | $Al(H_2PO_4)_3$ | $Na_2HPO_4 \cdot$ | 0.16 | 0.64 | 6.81 | 50% (w/v) |
| C-5B | 2 × (APM + DSP) | $Na^+$ | (APM) | $7H_2O$ (DSP) | 0.32 | 1.27 | | Aqueous w ppt. |
| C-6A | MZP + DSP | $Zn^{2+}$ | $Zn(H_2PO_4)_2$ | $Na_2HPO_4 \cdot$ | 0.16 | 0.68 | 6.81 | 50% (w/v) |
| C-6B | 2 × (MZP + DSP) | $Na^+$ | (MZP) | $7H_2O$ (DSP) | 0.32 | 1.36 | | Aqueous w ppt. |
| C-7A | SHMP | $Na^+$ | $(NaPO_3)_n$ (SHMP) (65-70% $P_2O_5$) | | 0.16 | 0.37 | 6.82 | 50% (w/v) |
| C-7B | 2 × SHMP | | | | 0.32 | 0.74 | | Aqueous |
| C-8A | DSP | $Na^+$ | $Na_2HPO_4 \cdot 7H_2O$ (DSP) | | 0.16 | 0.94 | 8.98 | 50% (w/v) |
| C-8B | 2 × DSP | | | | 0.32 | 1.89 | | Aqueous |

The results of the testing Example 1 (A and B) and Comparative Examples 1-8 (A and B) are shown in FIG. 1, specifically a plot of percent polycarbonate molecular weight retention of extruded pellets after autoclaving at 110° C. and 100% relative humidity for 11 days as a function of added basis of differences in secondary buffer cation forms, loading levels. The phosphate buffer loading levels used in these examples were further decreased due to the observation of positive effects with lower buffer strengths as seen in previous FIG. 1. The buffers were in aqueous form.

TABLE 5

| Ex. No. | Buffer | Cation Form | Acid Form | Base Form | P Loading (mol/ 10 lbs) | Salt Loading (wt. %) | pH | Physical Form |
|---|---|---|---|---|---|---|---|---|
| 2A | 0.25 × (MPP + DPP) | $K^+$ | $KH_2PO_4$ | $K_2HPO_4 \cdot 3H_2O$ | 0.04 | 0.16 | 6.82 | 50% (w/v) |
| 2B | 0.5 × (MPP + DPP) | | (MPP) | (DPP) | 0.08 | 0.31 | | Aqueous |
| 2C | MPP + DPP | | | | 0.16 | 0.63 | | |
| 3A | 0.25 × (LPM + DPP) | $Li^+$ | $LiH_2PO_4$ | $K_2HPO_4 \cdot 3H_2O$ | 0.04 | 0.14 | 6.81 | 50% (w/v) |
| 3B | 0.5 × (LPM + DPP) | $K^+$ | (LPM) | (DPP) | 0.08 | 0.28 | | Aqueous |

TABLE 5-continued

| Ex. No. | Buffer | Cation Form | Acid Form | Base Form | P Loading (mol/ 10 lbs) | Salt Loading (wt. %) | pH | Physical Form |
|---|---|---|---|---|---|---|---|---|
| 3C | LPM + DPP | | | | 0.16 | 0.57 | | w ppt. |
| 4A | 0.25 × (APM + DPP) | $Al^{3+}$ | $Al(H_2PO_4)_3$ | $K_2HPO_4 \cdot 3H_2O$ | 0.04 | 0.14 | 6.81 | 50% (w/v) |
| 4B | 0.5 × (APM + DPP) | $K^+$ | (APM) | (DPP) | 0.08 | 0.29 | | Aqueous |
| 4C | APM + DPP | | | | 0.16 | 0.57 | | w ppt. |
| 5A | 0.25 × (MZP + DPP) | $Zn^{2+}$ | $Zn(H_2PO_4)_2$ | $K_2HPO_4 \cdot 3H_2O$ | 0.04 | 0.15 | 6.81 | 50% (w/v) |
| 5B | 0.5 × (MZP + DPP) | $K^+$ | (Mp) | (DPP) | 0.08 | 0.31 | | Aqueous |
| 5C | MZP + DPP | | | | 0.16 | 0.62 | | w ppt. |

Figure 2:
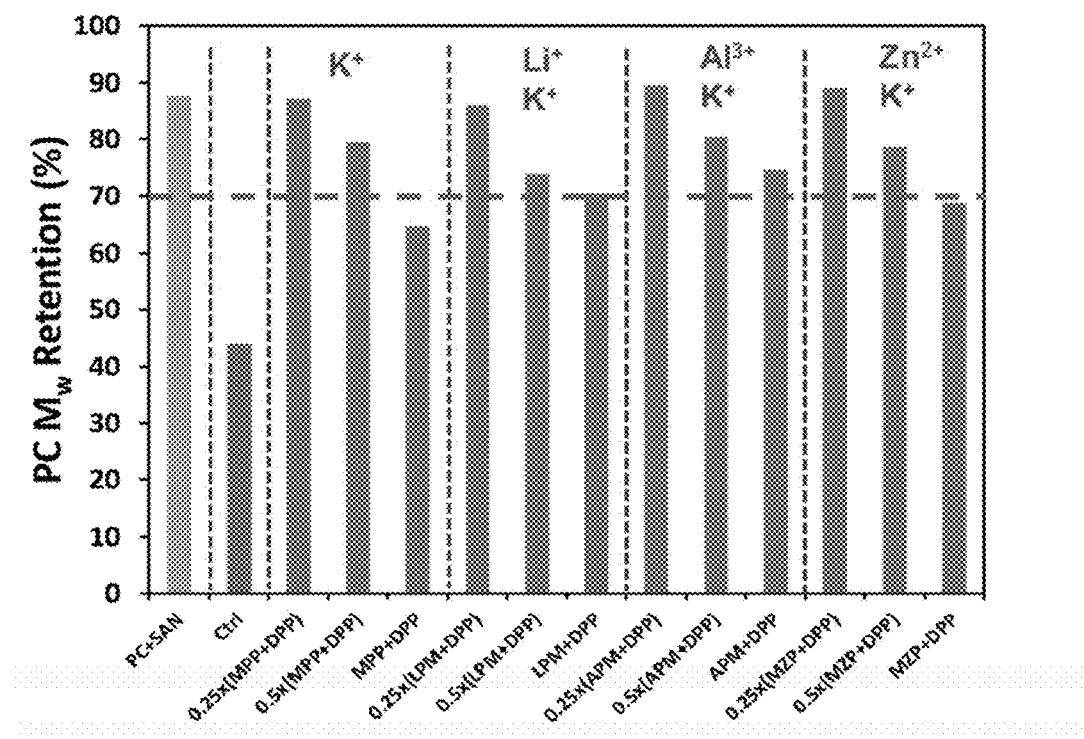
FIG. 2 shows a plot of percent polycarbonate molecular weight retention of molded Izod bars after hydro-aging for 11 days as a function of potassium based buffers, and strengths thereof, added during compounding.

The results of testing Examples 2-5 (A-C) are shown in FIG. 2, specifically a plot of percent polycarbonate molecular weight retention on molded Izod bars after 11 days autoclaving as a function of added potassium based buffers and their strength during compounding. As expected, in the absence of the high rubber ABS graft copolymer in the formulation, 90% of polycarbonate molecular weight was retained in the Izod bars, while the residual acidic surfactant and coagulant in the ABS graft copolymer adversely affected the polycarbonate molecular weight retention (~45%) in the control formulation. As shown in FIG. 2, the blends with added potassium based buffers, regardless of the presence of secondary buffer cation forms, exhibited increased polycarbonate molecular weight retention at lower buffer strengths (e.g., phosphorus (P) loading level at 0.04 mol/10 lbs), further illustrating the benefit of potassium based buffer addition during compounding on hydrostability improvement in polycarbonate/emulsion-ABS blends.

To further confirm whether improved hydrostability in polycarbonate/emulsion ABS blends was indeed the result of potassium based buffer addition, standard ISO T-bars (tensile bars) containing buffers were hydro-aged under the condition of Chrysler Company's hydrostability requirement (e.g., aged in an oven for 1000 hours maintained at 90±2° C. and 95±3% relative humidity (RH), in which the presence of air allows for rubber oxidation that is not seen in the anaerobic autoclave conditions). Similarly, the experimental blends were treated by various phosphate buffers based on potassium or combinations of potassium and secondary cations but here at even lower loading levels (e.g., phosphorus loading levels of 0.01-0.04 mol/10 lbs). The detailed description and compositions of used buffers were listed in Table 6, in which various potassium based buffers were studied on the basis of differences in secondary buffer cation forms, loading levels, and the resulting buffer physical forms.

TABLE 6

| Ex. No. | Buffer | Cation Form | Acid Form | Base Form | P Loading (mol/ 10 lbs) | Salt Loading (wt. %) | pH | Physical Form |
|---|---|---|---|---|---|---|---|---|
| 6A | 0.0625 × (MPP + DPP) | $K^+$ | $KH_2PO_4$ (MPP) | $K_2HPO_4 \cdot 3H_2O$ (DPP) | 0.01 | 0.039 | 6.82 | 50% (w/v) |
| 6B | 0.125 × (MPP + DPP) | | | | 0.02 | 0.079 | | Aqueous |
| 6C | 0.25 × (MPP + DPP) | | | | 0.04 | 0.16 | | |
| 7A | 0.0625 × (LPM + DPP) | $Li^+$ $K^+$ | $LiH_2PO_4$ (LPM) | $K_2HPO_4 \cdot 3H_2O$ (DPP) | 0.01 | 0.036 | 6.81 | 50% (w/v) |
| 7B | 0.125 × (LPM + DPP) | | | | 0.02 | 0.071 | | Aqueous w ppt. |
| 7C | 0.25 × (LPM + DPP) | | | | 0.04 | 0.14 | | |
| 8A | 0.0625 × (APM + DPP) | $Al^{3+}$ $K^+$ | $Al(H_2PO_4)_3$ (APM) | $K_2HPO_4 \cdot 3H_2O$ (DPP) | 0.01 | 0.036 | 6.81 | 50% (w/v) |
| 8B | 0.125 × (APM + DPP) | | | | 0.02 | 0.072 | | Aqueous w ppt. |
| 8C | 0.25 × (APM + DPP) | | | | 0.04 | 0.14 | | |
| 9A | 0.0625 × (MZP + DPP) | $Zn^{2+}$ $K^+$ | $Zn(H_2PO_4)_2$ (MZP) | $K_2HPO_4 \cdot 3H_2O$ (DPP) | 0.01 | 0.039 | 6.81 | 50% (w/v) |
| 9B | 0.125 × (MZP + DPP) | | | | 0.02 | 0.077 | | Aqueous w ppt. |
| 9C | 0.25 × (MZP + DPP) | | | | 0.04 | 0.15 | | |
| 10 | 0.25 × (MPP + DPP) | $K^+$ | $KH_2PO_4$ (MPP) | $K_2HPO_4 \cdot 3H_2O$ (DPP) | 0.04 | 0.16 | 6.52 | 50% (w/v) Aqueous |

Figure 3:
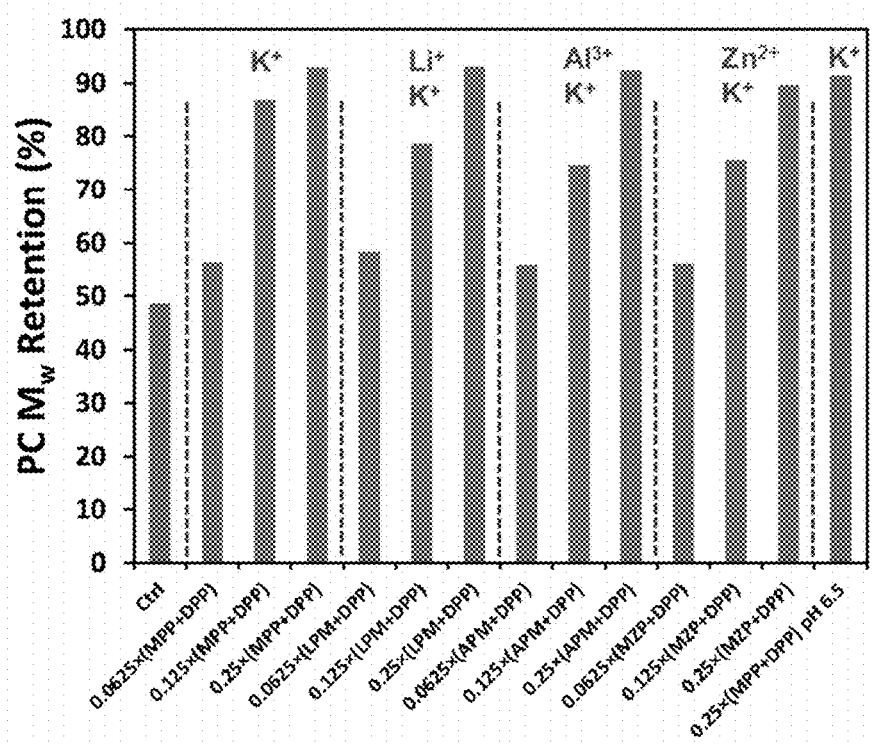
FIG. 3 shows a plot of percent polycarbonate molecular weight retention after hydro-aging of molded T-bars for 1000 hours as a function of buffers based on potassium, and strengths thereof, added during compounding.
Figure 4:
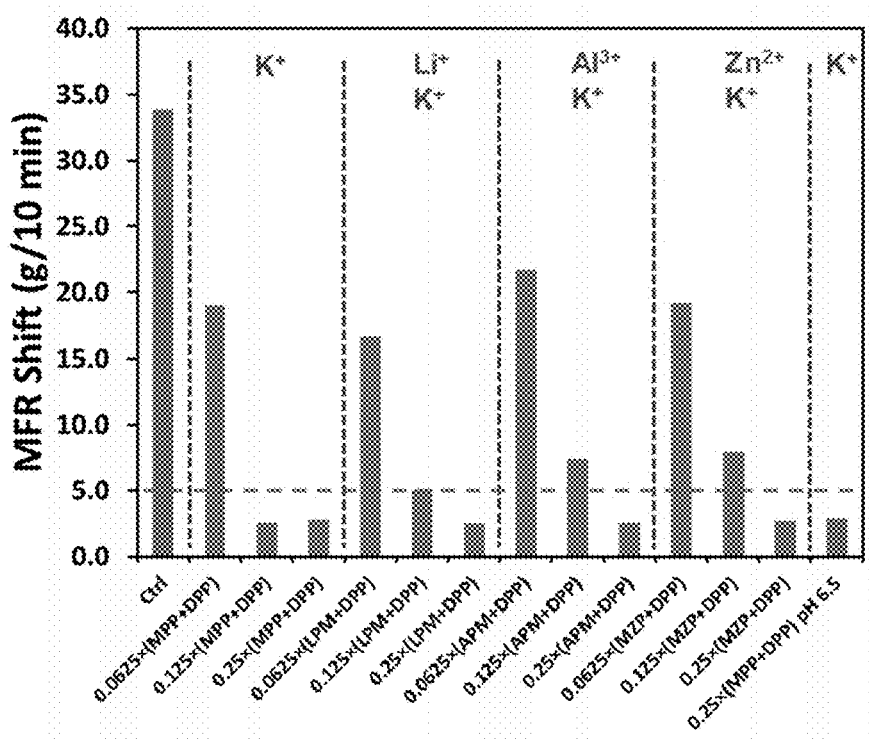
FIG. 4 shows a plot of melt volume rate (MFR) shift for molded Izod bars after hydro-aging of molded T-bars for 1000 hours as a function of buffers based on potassium added, and strengths thereof, during compounding.

The results on testing the buffering agents in Table 6 are shown in FIGS. 3 and 4. In FIG. 3, the percent polycarbonate molecular weight retention after 1000 hours hydro-aging under conditions of Chrysler Company's requirements (90° C. and 95% relative humidity) of molded T-bars is plotted as a function of added buffers based on potassium and their strengths during compounding. FIG. 4 shows a plot of ISO MFR shift (230° C./3.8 kg/300 s) for molded T-bars after 1000 h hydro-aging under conditions of Chrysler Company's requirements (90° C. and 95% relative humidity) as a function of added buffers based on potassium and their strengths during compounding.

In particular, the addition of relatively higher strengths of potassium-based buffers (e.g., P loading levels of 0.02-0.04 mol/10 lbs) resulted in increased polycarbonate molecular retention (~80-90%) after 1000 h hydro-aging under conditions of Chrysler Company's requirement (e.g., 90° C. and 95% relative humidity), regardless of the presence of secondary cations and their forms (FIG. 3). The ISO MFR shift (230° C./3.8 kg/300 s) of molded T-bars was also determined to compare the melt stability after 1000 h hydro-aging under conditions of Chrysler Company's requirement (90° C. and 95% relative humidity) as a function of the added potassium based buffer strengths and secondary cation forms (FIG. 4). As expected, in the absence of phosphate buffers (i.e., control), significant ISO MVR shift was observed (~33 g/10 min) due to polycarbonate degradation arising from the presence of residual dimer and sulfuric acids in ABS HRG. In addition, the results demonstrated decreased MFR shift of molded Izod bars (e.g., delta MFR less than 5; in accordance with Chrysler Company's hydrostability testing requirements) with added potassium based buffers at higher loading levels (e.g., P loading level at 0.04 mol/10 lbs) after 1000 h hydro-aging. Collectively, these results illustrated the potential of potassium based buffer addition during compounding as highly effective solutions to hydrostability improvement in polycarbonate/emulsion-ABS blends.

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. An impact resistant polycarbonate composition having improved resistance to polymer degradation comprising an aromatic polycarbonate in admixture with an elastomer-modified graft copolymer that is the product of an emulsion polymerization process, the composition further comprising metallic salts of phosphoric acid, at least one of which is a potassium salt of phosphoric acid, wherein the metallic salts of phosphoric acid are present in the composition in an amount that provides a phosphorus content of 0.01 to 0.16 mol/10 lbs (0.0022 to 0.035 mol/kg), based on the weight of the composition,
wherein the metallic salts of phosphoric acid comprise a weak acid form and a conjugate base form and wherein the weak acid and conjugate base are pairs selected from the group consisting of monopotassium phosphate/dipotassium phosphate, lithium phosphate monobasic/dipotassium phosphate, aluminum phosphate monobasic/dipotassium phosphate, monozinc phosphate/dipotassium phosphate, and combinations thereof; and
wherein after aging molded ISO T-bars of the composition in an oven for 1000 hours at 90±2° C. and 95±3% RH, the melt flow rate (MFR) of the polycarbonate composition does not change by more than 5.0 g/10 minutes units measured in accordance with ISO 1133 standard at 230° C. using a 3.8 kg load and 300 sec dwell time.

2. The composition of claim 1, wherein the metallic salts of phosphoric acid comprise a weak acid form and a conjugate base that are present in a relative amount that is capable of forming a buffer in distilled water having a pH of 6.4 to 7.0.

3. The composition of claim 1, wherein the phosphorus atoms in the metallic salt of phosphoric acid are present in an amount of between 0.020 to 0.12 mol/10 pounds (0.0044 to 0.026 mol/kg] of the composition.

4. The composition of claim 3, wherein the ratio of the weak acid form to the conjugate base form is capable of providing a pH of 6.5 to 6.8 in distilled water.

5. The composition of claim 1, comprising in admixture about 48 to about 75 weight percent of the aromatic polycarbonate and about 52 to about 25 weight percent of the elastomer-modified graft copolymer polymer and optional polymeric flow promoter, based on the total weight of polycarbonate, elastomer-modified graft copolymer, and polymeric flow promoter.

6. The composition of claim 1, wherein the metallic salts comprise a conjugate base form in which potassium is a metal cation and a weak acid form having a different metal cation.

7. The composition of claim 1, wherein metallic salts comprise a conjugate base form and a weak acid form that are both potassium salts in which potassium is the metal cation.

8. The composition of claim 1, further comprising residual surfactant used during the emulsion polymerization process of making the elastomer-modified graft copolymer.

9. The composition of claim 8, wherein the surfactant is selected from the group consisting of alkali metal salts of fatty acids and alkali metal carbonates.

10. The composition of claim 1, further comprising residual strong acid used to coagulate the elastomer-modified graft copolymer.

11. The composition of claim 10, comprising residual sulfuric acid used as a coagulant.

12. The composition of claim 1, wherein the elastomer-modified graft copolymer was prepared without using a phosphate compound for buffering, wherein any phosphate compound used during the preparation of the elastomer-modified copolymer was not capable of effectively providing a pH of 6.4 to 7.0.

13. The composition of claim 1, wherein after aging in an oven for 1000 hours at 90±2° C. and 95±3% RH, the polycarbonate composition exhibits a change in the melt flow rate (MFR) that is at least 10 g/10 minutes less than the change in the same composition in which the metallic salt of phosphoric acid is not present, wherein melt flow rate is measured in accordance with ISO 1133 standard at 230° C. using a 3.8 kg load and 300 sec dwell time.

14. The composition of claim 1, wherein after aging the polycarbonate composition in an oven for 1000 hours at 90±2° C. and 95±3% RH, at least 60 percent of the molecular weight of the polycarbonate is retained, measured by Gel Permeation Chromatography (GPC).

15. The composition of claim 1, wherein after aging the polycarbonate composition in an oven for 1000 hours at 90±2° C. and 95±3% RH, the molecular weight retention of the polycarbonate is at least 10 percent greater than the same composition in which the metallic salt of phosphoric acid is not present.

16. The composition of claim 1, wherein the polycarbonate has a $M_w$ of 20,000 to 200,000.

17. An impact resistant polycarbonate composition having improved resistance to polymer degradation comprising an aromatic polycarbonate in admixture with an elastomer-modified graft copolymer that is the product of an emulsion polymerization process, wherein the composition is a product of compounding the aromatic polycarbonate and the elastomer-modified graft copolymer in the presence of a buffer comprising metallic salts of phosphoric acid, wherein the buffer comprises a weak acid form and a conjugate base form that is capable of providing a pH of 6.4 to 7.0 in distilled water, wherein at least one of the weak acid form and conjugate base form comprises a potassium salt of phosphoric acid.

18. The composition of claim 17, wherein the metallic salts of phosphoric acid comprises phosphorus in the amount of 0.01 to 0.16 mol/10 lbs (0.0022 to 0.035 mol/kg) of the composition.

19. The composition of claim 17, wherein the metallic salts of phosphoric acid comprise a weak acid form and a conjugate base form, both of which is a potassium salt of phosphoric acid.

20. A method of preparing a polycarbonate composition having improved resistance to polymer degradation comprising:
    carrying out emulsion polymerization of a monomer mixture comprising a diene monomer, thereby forming an elastomer polymer;
    grafting monomers onto the elastomer polymer to obtain an elastomer-modified graft copolymer; and
    compounding the elastomer-modified graft copolymer with an aromatic polycarbonate in the presence of a buffer comprising metallic salts of phosphoric acid, at least one of which comprises a potassium salt of phosphoric acid.

21. The method of claim 20, wherein the metallic salts of phosphoric acid comprise a weak acid form and a conjugate base form and is capable of providing a pH of 6.4 to 7.0 in distilled water.

22. The method of claim 20, wherein the metallic salts of phosphoric acid comprise a weak acid form and a conjugate base form, at least one of which is a potassium salt of phosphoric acid.

23. The method of claim 20, wherein the elastomer-modified graft copolymer is compounded with the aromatic polycarbonate and the metallic salts of phosphoric acid in an extruder.

24. The method of claim 20, wherein an aqueous solution of the buffer comprising the metallic salts of phosphoric acid is introduced into a blend of the elastomer-modified graft copolymer and aromatic polycarbonate, which polymers are in the form of particulate solids, and wherein compounding comprises introducing the buffer and polymers into an extruder.

25. The method of claim 20, wherein the elastomer-modified graft copolymer is prepared by an emulsion polymerization process in the presence of a surfactant and is coagulated with an acidic coagulant.

26. The method of claim 25, wherein the elastomer-modified graft copolymer is prepared by an emulsion polymerization process in the presence of a surfactant selected from the group consisting of metallic salts of a $C_8$-$C_{48}$ organic carboxylic acids and mixtures thereof.

27. The method of claim 20, wherein the method further comprises coagulating a latex of the elastomer-modified graft copolymer and drying the coagulated elastomer-modified graft copolymer prior to compounding with the aromatic polycarbonate.

28. The method of claim 27, wherein the elastomer-modified graft copolymer is coagulated with an acid having a $pK_a$ of less than 5.0.

29. An article made from the composition of claim 1.

30. The article of claim 29, wherein the article is a molded automotive part selected from the group consisting of spoilers, instrument panels, instrument panel retainers, interior trim, truck roof fairings, truck hoods, car hoods, bumpers, mirror housings, and electroplated wheel covers, hub caps, emblem logos, exterior trim, and door handles.

* * * * *